(12) United States Patent
Ueda et al.

(10) Patent No.: US 7,612,774 B2
(45) Date of Patent: Nov. 3, 2009

(54) MESH DIVIDING DEVICE, COMPUTER-READABLE RECORDING MEDIUM IN WHICH MESH DIVIDING PROGRAM IS RECODED, AND METHOD FOR SETTING MAXIMUM NUMBER OF CUBOIDS AND PARAMETERS FOR MESH-DIVISION

(75) Inventors: Akira Ueda, Kawasaki (JP); Yasushi Uraki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1061 days.

(21) Appl. No.: 10/806,333

(22) Filed: Mar. 23, 2004

(65) Prior Publication Data

US 2005/0083328 A1    Apr. 21, 2005

(30) Foreign Application Priority Data

Oct. 15, 2003    (JP)    ............................. 2003-355303

(51) Int. Cl.
*G06T 15/30* (2006.01)
(52) U.S. Cl. ..................................... 345/423
(58) Field of Classification Search ................. 345/423
See application file for complete search history.

(56) References Cited

U.S. PATENT DOCUMENTS

| 5,892,515 | A | | 4/1999 | Kobayashi et al. | .......... 345/423 |
| 5,946,479 | A | * | 8/1999 | Sakaguchi et al. | ............ 716/20 |
| 6,535,211 | B1 | * | 3/2003 | Hariya et al. | ............... 345/423 |
| 2001/0051002 | A1 | | 12/2001 | Shimamura et al. | ......... 382/154 |
| 2002/0052720 | A1 | * | 5/2002 | Nishiura | ..................... 702/189 |
| 2002/0144231 | A1 | * | 10/2002 | Hariya et al. | ................. 716/20 |
| 2004/0148145 | A1 | * | 7/2004 | Chen et al. | ..................... 703/2 |

FOREIGN PATENT DOCUMENTS

| JP | 1-311373 | 12/1989 |
| JP | 8-320948 | 12/1996 |

(Continued)

OTHER PUBLICATIONS

Notice of Grounds of Rejection dated Aug. 18, 2009 issued in counterpart Japanese Patent Application No. 2003-355303, with English translation.

*Primary Examiner*—Kee M Tung
*Assistant Examiner*—Edward Martello
(74) *Attorney, Agent, or Firm*—Westerman, Hattori, Daniels & Adrian, LLP.

(57) ABSTRACT

The present invention relates to a device capable of easily and reliably selecting and determining parameters such as the optimum maximum number of cuboids and the like corresponding to an analytical target model. For this purpose, in the present invention, two or more kinds of parameter kits each including a maximum number of cuboids and parameters for division control for producing cuboids are previously stored in a library, at least one of the two or more kinds of parameter kits stored in the library is selected, and the analytical target model is divided, based on the selected parameter kit and the three-dimensional CAD data, into cuboids of less than or equal to a maximum number of cuboids included in the selected parameter kit. Such present invention is preferably applied to automatic conversion software for converting three-dimensional CAD data obtained by Pro/E, I-DES, Parasalid, AutoCAD, VPS, or the like.

24 Claims, 20 Drawing Sheets

FOREIGN PATENT DOCUMENTS

| | | |
|---|---|---|
| JP | 9-138812 | 5/1997 |
| JP | 10-255077 | 9/1998 |
| JP | HEI 11-066132 A | 3/1999 |
| JP | 11-144093 | 5/1999 |
| JP | 2001-357082 | 12/2001 |
| JP | 2002-149718 | 5/2002 |
| JP | 2002-157281 A | 5/2002 |
| JP | 2003-132099 A | 5/2003 |

\* cited by examiner

MAXIMUM NUMBER OF CUBOIDS: 30

MAXIMUM NUMBER OF CUBOIDS: 150

FIG. 7A
FIG. 7B
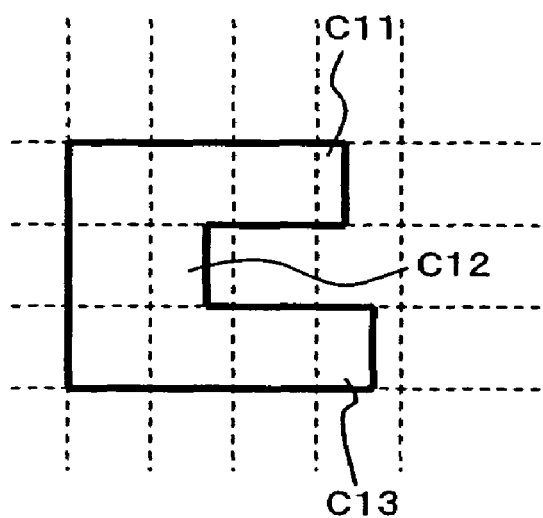
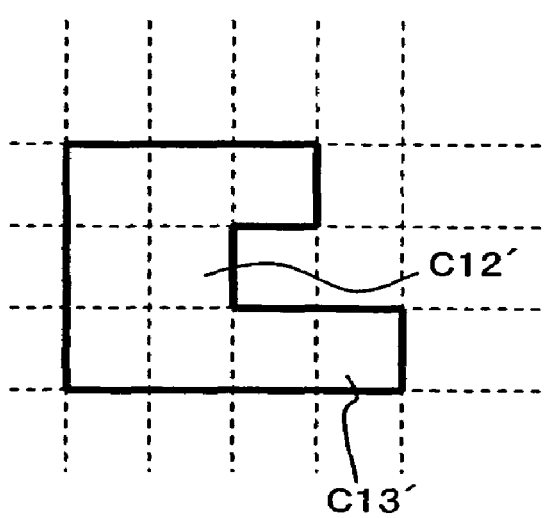

FIG. 12

TABLE A : OF DIMENSIONS

| No. | ITEM | VALUE | ITEM | VALUE | ITEM | VALUE |
|---|---|---|---|---|---|---|
| 1 | NUMBER OF COMPONENTS | 45.0 | | | | |
| 2-1 | MAXIMUM SIZE OF COMPONENT 01:X | 15.0 | MAXIMUM SIZE OF COMPONENT 01:Y | 23.0 | MAXIMUM SIZE OF COMPONENT 01:Z | 50.0 |
| 2-2 | MAXIMUM SIZE OF COMPONENT 02:X | 21.0 | MAXIMUM SIZE OF COMPONENT 02:Y | 10.0 | MAXIMUM SIZE OF COMPONENT 02:Z | 78.0 |
| ... | | | | | | |
| 2-n | MAXIMUM SIZE OF COMPONENT 0n:X | 10.0 | MAXIMUM SIZE OF COMPONENT 0n:Y | 23.0 | MAXIMUM SIZE OF COMPONENT 0n:Z | 36.0 |
| ... | | | | | | |
| 2-45 | MAXIMUM SIZE OF COMPONENT 45:X | 80.0 | MAXIMUM SIZE OF COMPONENT 45:Y | 55.0 | MAXIMUM SIZE OF COMPONENT 45:Z | 86.0 |
| 3 | SIZE OF DEVICE:X | 260.0 | SIZE OF DEVICE:Y | 450.0 | SIZE OF DEVICE:Z | 350.0 |

FIG. 13

TABLE B : VALUES OF PHYSICAL PROPERTIES

| No. | ITEM | NAME | MATERIAL | VALUE OF PHYSICAL PROPERTY 1 | VALUE OF PHYSICAL PROPERTY 2 | VALUE OF PHYSICAL PROPERTY 3 |
|---|---|---|---|---|---|---|
| 4-1 | COMPONENT:01 | PCB | EPOXY RESIN | 0.3 | 1.4 | 1190 |
| 4-2 | COMPONENT:02 | PCB | EPOXY RESIN | 0.3 | 1.4 | 1190 |
| ... | | | | | | |
| 4-n | COMPONE:0n | COVER | STEEL | 43.0 | 0.5 | 7850 |
| ... | | | | | | |
| 4-45 | COMPONE:45 | DEVICE | CERAMIC | 36.0 | 0.8 | 3890 |

FIG. 16

○ SCALE OF DEVICE
    □ LARGE-SIZED SERVER
    ■ SMALL/MEDIUM-SIZED DEVICE
    □ PERSONAL COMPUTER
    □ MAGNETIC DISK
    □ MOBILE TELEPHONE
○ IMPLEMENTATION FORM
    ■ HIGH DENSITY
    □ MEDIUM DENSITY
    □ LOW DENSITY
○ CONDUCTIVITY
    ■ HIGH CONDUCTIVITY
    □ MEDIUM CONDUCTIVITY
    □ LOW CONDUCTIVITY
    □ NONCONDUCTIVITY

EDIT    SELECT

FIG. 17
PARAMETER KIT SELECTION TABLE
|  | KIT 1 | KIT 2 | KIT 3 | KIT 4 |
|---|---|---|---|---|
| ○SCALE OF DEVICE |  |  |  |  |
| □LARGE-SIZED SERVER | ○ |  |  |  |
| ■SMALL/MEDIUM-SIZED DEVICE |  | ○ |  |  |
| ... |  |  |  | ○ |
| □MOBILE TELEPHONE |  |  | ○ |  |
| ○IMPLEMENTATION FORM |  |  |  |  |
| ■HIGH DENSITY |  | ○ | ○ |  |
| ... |  |  |  | ○ |
| □LOW DENSITY | ○ |  |  |  |
| ○CONDUCTIVITY |  |  |  |  |
| ■HIGH CONDUCTIVITY | ○ | ○ |  |  |
| ... |  |  | ○ |  |
| □NONCONDUCTIVITY |  |  |  | ○ |
FIG. 18A
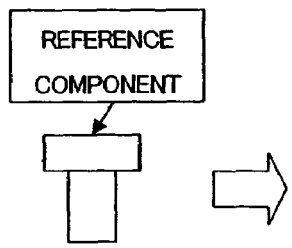
FIG. 18B
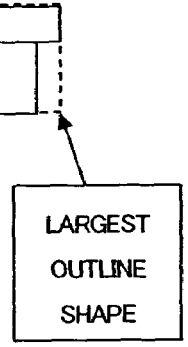
LARGEST OUTLINE SHAPE
FIG. 18C
| MAXIMUM X-VALUE | 5.0 |
|---|---|
| MAXIMUM Y-VALUE | 3.5 |
| MAXIMUM Z-VALUE | 3.5 |

FIG. 19

| MAXIMUM NUMBER OF CUBOIDS: xxxx | |
|---|---|
| DIVISION NUMBER IN X-DIRECTION: XX | CONVERSION TIME: |
| DIVISION NUMBER IN Y-DIRECTION: YY | _____ MINUTES |
| DIVISION NUMBER IN Z-DIRECTION: ZZ | |
| TOTAL NUMBER OF DIVISIONS: SSSS | Close |

FIG. 21

TABLE C : OF PARAMETERS

| No. | ITEM | VALUE | ITEM | VALUE | ITEM | VALUE |
|---|---|---|---|---|---|---|
| 1 | MAXIMUM NUMBER OF CUBOIDS | 200 | | | | |
| 2 | NUMBER OF MESH-DIVISION : X | 20 | NUMBER OF MESH-DIVISION : Y | 40 | NUMBER OF MESH-DIVISION Z | 20 |
| 3 | TOLERANCE: X | 0.5 | TOLERANCE: Y | 0.5 | TOLERANCE: Z | 0.5 |
| 4 | BALANCED-VOLUME CONVERSION RATE | 0.4 | | | | |
| 5 | UNBALANCED-VOLUME CONVERSION RATE | 0.7 | | | | |
| 6 | SIZE OF REFERENCE COMPONENT: X | 65.0 | SIZE OF REFERENCE COMPONENT: Y | 32.0 | SIZE OF REFERENCE COMPONENT: Z | 50.0 |

MESH DIVIDING DEVICE, COMPUTER-READABLE RECORDING MEDIUM IN WHICH MESH DIVIDING PROGRAM IS RECODED, AND METHOD FOR SETTING MAXIMUM NUMBER OF CUBOIDS AND PARAMETERS FOR MESH-DIVISION

BACKGROUND OF THE INVENTION

1) Field of the Invention

The present invention relates to a technique for performing a mesh dividing process to divide an analytical target model provided as three-dimensional CAD (Computer Aided Design) data into cuboids (shaped like a hexahedron; actually shaped like a rectangular solid) for a numerical analysis.

2) Description of the Related Art

In general, when performing a numerical analysis such as a structural analysis, mechanism analysis, heat-transfer analysis, fluid analysis, thermal-fluid analysis, electromagnetic-field analysis, magnetic-field analysis, or the like using a computer, the numerical analysis is efficiently performed by producing cuboids (basic elements for the numerical analysis; generally referred to mesh elements or grid elements) shaped like a rectangular solid through dividing a target for the numerical analysis, by obtaining characteristic values representing the characteristic of each of the cuboids, and by approximating the target for the numerical analysis at a group of the basic elements (see Patent References 1 to 4 listed below).

In recent years, along with size and weight reductions of electronic devices as computer peripheral equipment, design of structures for appropriately controlling the behavior of heat generated by the electronic devices (e.g. MO (Magneto Optical disk) drives, printers, notebook-sized personal computers, servers, mobile telephones, etc.) has been desired, hence it has been required to accurately analyze the behavior of heat on complicated structures in the electronic devices. For this reason, software for thermal-fluid analysis has been developed as a tool for analyzing the behavior of heat through a computer, and when a numerical analysis is performed with the software, the data divided into cuboids described above is used.

On the other hand, in recent years, automatic conversion software has also been developed, which converts three-dimensional CAD data (geometric data or three-dimensional solid model data) obtained by a CAD system (e.g. Pro/E, I-DEAS, Parasolid, AutoCAD, VPS, or the like) into cuboid data used for numerical analyses in various software.

In the automatic conversion software, a default value previously set in an initial file is generally used as a maximum number of cuboids which defines the upper limit of the number of division of cuboids. Further, the number of mesh-division in the three directions (X-direction, Y-direction, and Z-direction) are independently designated, and division of an analytical target model is performed so that an actual number of cuboids does not exceed the maximum number of cuboids (default value).

In case that the maximum number of cuboids is smaller, the number of cuboids obtained by dividing the analytical target model is also smaller; thereby the analytical processing speed becomes higher but the analytical accuracy decreases. On the contrary, in case that the maximum number of cuboids is larger, the number of cuboids obtained by dividing the analytical target model is also larger, thereby the analytical accuracy is more improved but the analytical processing speed becomes lower. Since the analytical processing speed and the analytical accuracy are heavily affected by complexity of the structure of the analytical target model, in order that the user obtains a desired analytical processing speed and analytical accuracy it is preferable to use not the fixed default value but the optimum maximum number of cuboids corresponding to the complexity of the structure of the analytical target model.

However, under the present circumstances, if the user takes no action, the default value is used as the maximum number of cuboids. For this reason, in order to obtain a desired analytical processing speed and analytical accuracy, conventionally the user needs to modify or change the definition or setting of the maximum number of cuboids when starting the system. In this case, the user appropriately designates a maximum number of cuboids corresponding to the analytical target model, or modifies the maximum number of cuboids once or several times, and actually performs a mesh dividing process to decide the optimum maximum number of cuboids based on the result of the destination or modification.

[Patent Reference 1] Japanese Patent Application Laid-Open NO. HEI10-255077

[Patent Reference 2] Japanese Patent Publication NO. 2657301

[Patent Reference 3] Japanese Patent Publication NO. 3132336

[Patent Reference 4] Japanese Patent Application Laid-Open NO. HEI09-138812

As described above, conventionally, when a maximum number of cuboids is set or modified, the maximum number of cuboids is designated according to the determination of the user, or decided by trial and error. In the former case (in case of user designation), there is a problem in the reliability of the maximum number of cuboids (the problem is whether the maximum number of cuboids is the optimum one corresponding to the analytical target model); in the latter case (in case of trial and error), much time is required to decide the maximum number of cuboids, and hence much time is required for the mesh dividing process.

Furthermore, in a conventional system, a function of estimating a conversion time required for a mesh dividing process for an analytical target model is not provided, the processing time is not clear at all, and the user is not able to ascertain the conversion time at all. In particular, when an analytical target model is a large-scale device, there is a much possibility of a long conversion time, and hence it is desired to make it possible to grasp how long the mesh dividing process needs, that is, how long the waiting time is.

SUMMARY OF THE INVENTION

The present invention has been developed in view of such problems and the object is to provide for easily and reliably selecting/deciding the parameters for the optimum maximum number of cuboids, etc., consequently for shortening the decide time of the maximum number of cuboids, etc., and finally for shortening the time required for a mesh division process. Furthermore, the object of the present invention is to provide for the step-up in the convenience of the user so that the user can grasp the conversion time required for the mesh division time that is the waiting time.

In order to achieve the above aims, a mesh dividing device according to the present invention is a mesh dividing device for performing a mesh dividing process of an analytical target model provided as three-dimensional CAD data into cuboids for numerical-analysis, and comprises: a library for previously storing two or more kinds of parameter kits each including a maximum number of cuboids which defines the upper limit of the number of the cuboids and parameters for division-control for dividing the analytical target model into the cuboids; a selecting unit selecting at least one of the two or more kinds of parameter kits stored in the library; and a mesh dividing unit performing a mesh dividing process so as to divide the analytical target model, based on a parameter kit selected by the selecting unit (hereinafter referred to selected parameter kit) and the three-dimensional CAD data, into cuboids of less than or equal to the maximum number of cuboids included in the selected parameter kit.

The mesh dividing device may further comprises a display unit capable of displaying various kinds of information including the contents of the two or more kinds of parameter kits stored in the library, the display unit displaying the contents of the selected parameter kit.

Furthermore, the mesh dividing device may further comprises a reference component designating unit by which the operator designates a reference component from the components of the analytical target model while referring to a display provided by the display unit, wherein the mesh dividing unit handles the reference component designated by the reference component designating unit, and a component smaller than the reference component, as exception to target for the mesh dividing process.

Furthermore, the mesh dividing device may further comprises a conversion time estimating unit for estimating, based on the selected parameter kit, a conversion time required for the mesh dividing unit to perform a mesh dividing process for the analytical target model, wherein the display unit displays the conversion time estimated by the conversion time estimating unit.

Furthermore, a computer-readable recording medium according to the present invention is a computer-readable recording medium in which a mesh dividing program for instructing a computer to function as a mesh dividing device for performing a mesh dividing process to divide an analytical target model provided as three-dimensional CAD data into cuboids for numerical-analysis, wherein the mesh dividing program includes a library for previously storing two or more kinds of parameter kits each including a maximum number of cuboids which defines the upper limit of the number of the cuboids and parameters for division-control for dividing the analytical target model into the cuboids, and instructs the computer to function as a selecting unit for selecting at least one of the two or more kinds of parameter kits stored in the library, and a mesh dividing unit for performing a mesh dividing process so as to divide the analytical target model, based on a parameter kit selected by the selecting unit and the three-dimensional CAD data, into cuboids of less than or equal to the maximum number of cuboids included in the selected parameter kit.

Furthermore, a method for setting a maximum number of cuboids/parameters for mesh-division according to the present invention is a method for setting, when performing a mesh dividing process to divide a analytical target model provided as three-dimensional CAD data into the cuboids, a maximum number of cuboids which defines the upper limit of the number of cuboids for numerical-analysis, and parameters for division-control for dividing the analytical target model into the cuboids, comprising the steps of: previously storing two or more kinds of parameter kits, as a library, each including the maximum number of cuboids and the parameters for division-control; selecting at least one of the two or more kinds of parameter kits stored in the library, when performing a mesh dividing process for the analytical target model; and setting a maximum number of cuboids and parameters for division-control included in the selected parameter kit, on a unit for performing the mesh dividing process.

According to the present invention described above, since one (or more) desired parameter kits can be selected from two or more kinds of parameter kits previously stored in the library, it can be provided for easily and reliably selecting/deciding the optimum maximum number of cuboids corresponding to an analytical target model. Consequently, it can be provided for significantly shortening a time required for deciding parameters such as a maximum number of cuboids, etc., finally not only for significantly shortening a time required for a mesh dividing process but also for performing on the mesh-division corresponding to an analytical target model.

In this case, since various kinds of information including the contents of the two or more kinds of parameter kits stored in the library are displayed by the display unit, the user is able to reliably select the optimum maximum number of cuboids while checking the contents of a selected parameter kit.

Furthermore, since a reference component is designated from the components of an analytical target mode by the reference component designating unit, and the reference component and any components smaller than the reference component are handled as exception to target for the mesh dividing process, the shape of the analytical target model can be simplified, accordingly it can be realized to simplify the mesh dividing process i.e. to shorten the processing time in response to the request of the user.

Furthermore, since a conversion time required for the mesh dividing process estimated by the conversion time estimating unit is displayed by the display unit, the user is able to immediately grasp the conversion time i.e. waiting time, consequently, the convenience of the user can be significantly improved.

BRIEF DESCRIPTION OF THE DRAWINGS

FIG. 4A shows an example of an analytical target model provided as three-dimensional CAD data; FIG. 4B shows a state that the analytical target model shown in FIG. 4A is divided using the maximum number of cuboids of 30; and FIG. 4C shows a state that the analytical target model shown in FIG. 4A is divided using the maximum number of cuboids of 150.

FIGS. 7A and 7B are figures illustrating a balanced-volume conversion rate.

FIG. 11A shows a configuration tree of the three-dimensional CAD data; FIG. 11B is a perspective view of the analytical target model device provided by the three-dimensional CAD data; and FIG. 11C is an exploded perspective view of the device shown in FIG. 11B.

FIG. 12 shows an example of a dimension table obtained from three-dimensional CAD data in this embodiment.

FIG. 13 shows an example of a physical property value table obtained from three-dimensional CAD data in this embodiment.

FIG. 16 shows an example of a parameter kit selection screen displayed on the display in this embodiment.

FIG. 17 shows an example of a parameter kit selection table stored in the library of this embodiment.

FIGS. 18A to 18C depict the reference component designating function in this embodiment: FIG. 18A shows an example of a reference component; FIG. 18B shows the largest outline shape of the reference component shown in FIG. 18A; and FIG. 18C shows the maximum outer dimensions obtained on the reference component shown in FIG. 18A.

FIG. 19 shows an example of a process outline displayed on the display in this embodiment.

FIG. 21 shows an example of a parameter table including information about a selected parameter kit and reference component selected in this embodiment.

DESCRIPTION OF THE PREFERRED EMBODIMENTS

An embodiment of the present invention is described below with reference to the drawings.

[1] Configuration of the Mesh Dividing Device of this Embodiment

Figure 1:
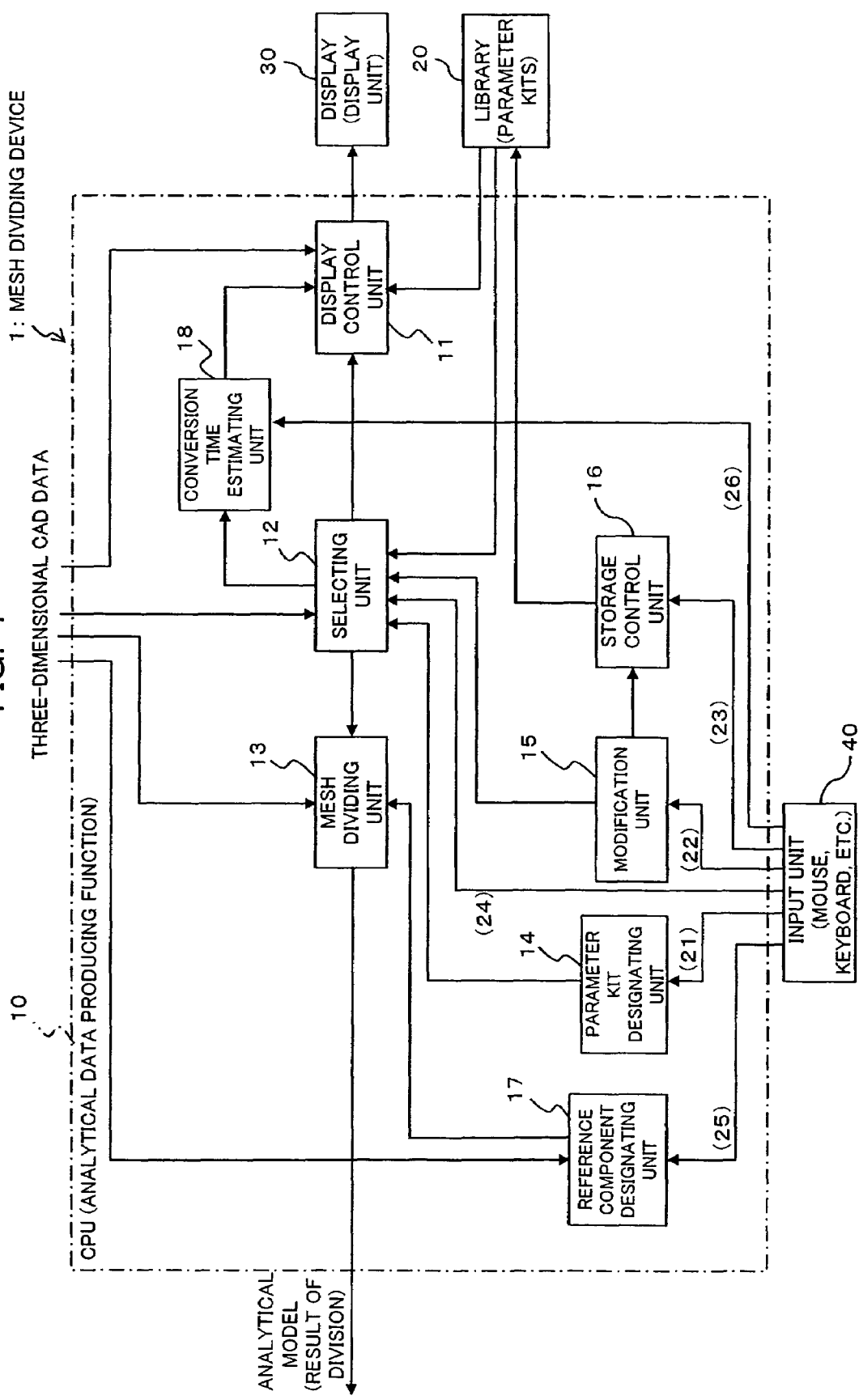
FIG. 1 is a block diagram showing the functional configuration of a mesh dividing device as an embodiment of the present invention.

FIG. 1 is a block diagram showing the functional configuration of a mesh dividing device as an embodiment of the present invention. As shown in FIG. 1, the mesh dividing device 1 of this embodiment performs a mesh dividing process for dividing an analytical target model externally provided as three-dimensional CAD data into cuboids, and consists of a personal computer for example. More specifically, the mesh dividing device 1 is provided with at least a CPU 10, a library 20, a display 30, and an input unit 40.

The library 20 is read from, for example, the mesh dividing program described later, and stored in a RAM (Random Access Memory), a ROM (Read Only Memory), or any of various storage devices (various recording mediums) constituting the mesh dividing device (personal computer) to be used.

In the library 20, as described later with reference to FIGS. 2, 3 and 21, two or more kinds of parameter kits each including a maximum number of cuboids which defines the upper limit of the number of cuboids, and parameters for division-control for producing cuboids, are previously stored. The parameters for division-control include the number of mesh-division in the three axial directions (X, Y, and Z directions), tolerances in the three axial directions (X, Y, and Z directions), a balanced-volume conversion rate, and an unbalanced-volume conversion rate. The maximum number of cuboids will be described later with reference to FIGS. 4A to 4C, the number of mesh-division will be described later with reference to FIG. 5, the tolerances will be described later with reference to FIGS. 6A and 6B, the balanced-volume conversion rate will be described later with reference to FIGS. 7A and 7B, and the unbalanced-volume conversion rate will be described later with reference to FIGS. 8A and 8B.

Each of the two or more kinds of parameter kits previously stored in the library 20 consists of a set of representative parameters (the maximum number of cuboids and parameters for division-control described above) corresponding to a device having various forms and various characteristics (various analytical target models). The device is a target for dividing process by the mesh dividing device 1. Further, in the library 20, each of the two or more kinds of parameters is previously classified and stored, in the form of the selection table described later with reference to FIG. 17, in correspondence with levels of shape-feature information and physical-property-feature information which are assumed for various analytical target models. The shape-feature information includes information about scales of analytical target models and implementation forms of the components of the analytical target models, and the physical-property-feature information includes, for example, information about thermal conductivity distributions in the analytical target models.

The display 30 (display unit) comprises, for example, an LCD (Liquid Crystal Display) or a CRT (Cathode Ray Tube), and displays the various information while the display state is controlled by a display control unit 11 described later. In particular, the display 30 in this embodiment, in order to realize a function as the mesh dividing device 1, displays:

(11) the contents of three-dimensional CAD data;

(12) the contents of the two or more kinds of parameter kits stored in the library 20;

(13) the contents of a selected parameter kit selected by the selecting unit 12 described later (see FIG. 3, for example);

(14) a parameter kit selection screen (see FIG. 16, for example); and

(15) a process outline including a conversion time estimated by the conversion time estimating unit 18 described later (see FIG. 19, for example).

The input unit 40 specifically comprises a mouse, a keyboard, etc., and the user (operator) who has referred to the various information displayed on the display 30 operates the input unit 40 to input various instructions from the outside of the mesh dividing device 1. As shown in FIG. 1, the various instructions through the input unit 40 in this embodiment include, for example as follows:

(21) an instruction for designating one parameter kit to read it from the library 20 (given by clicking the "Read" button in FIG. 3),

(22) an instruction for modifying the contents of a selected parameter kit displayed on the display 30 (given on the screen in FIG. 3),

(23) an instruction for storing the result of the modification (the modified contents of the parameter kit) into the library 20 (given by clicking the "Save" button in FIG. 3),

(24) an instruction for performing an automatic selection process by the selecting unit 12 described later (given by clicking the "Refer" button in FIG. 3)

(25) an instruction for designating one of the components of an analytical target model as the reference component (given by clicking "Reference Component" button in FIG. 3), and

Figure 3:
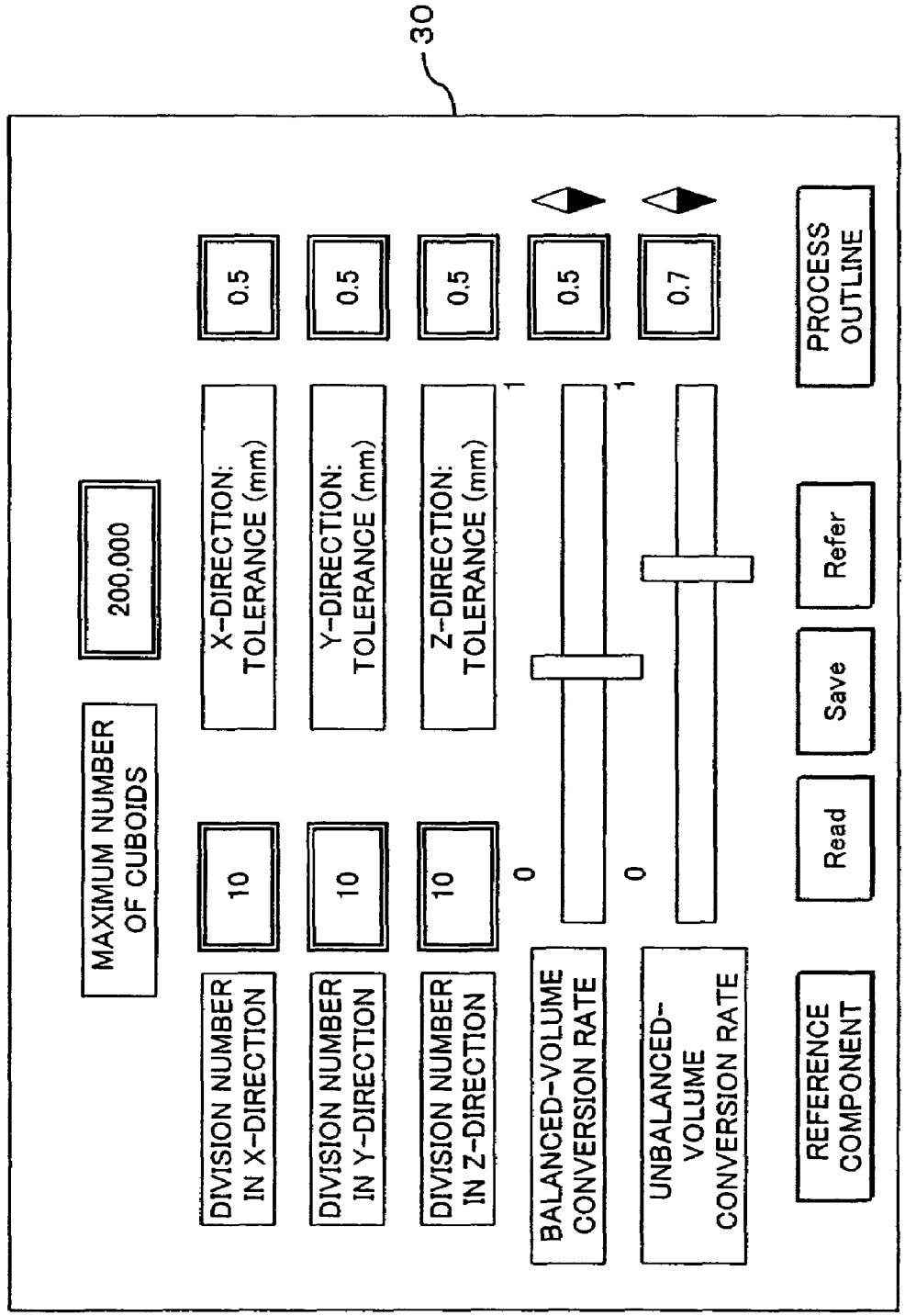
FIG. 3 shows an example of the display of the contents of a parameter kit in this embodiment.

(26) an instruction for performing the estimation of a conversion time through the selected parameter kit (given by clicking the "Process Outline" button in FIG. 3).

The CPU 10 performs, in response to the instruction from the input unit 40, an analytical data producing function of producing an analytical model from three-dimensional CAD data (analytical data; the data divided into cuboids from an analytical target model provided as three-dimensional CAD data) and outputting it; more specifically, the CPU 10 performs of the functions as a display control unit 11, a selecting unit 12, a mesh dividing unit 13, a parameter kit designating unit 14, a modification unit 15, a saving control unit 16, a reference component designating unit 17, and a conversion time estimating unit 18, through executing the mesh dividing program described later.

The display control unit 11 controls the display state of the display 30 to display the contents in the above items (11) to (15) or the screen on the display 30.

The selecting unit 12 is used for selecting at least one of the two or more parameter kits stored in the library 20 and notifying the mesh dividing unit 13 of the selected parameter kit, and performs:

(31) a function of selecting a parameter kit corresponding to designation information from the parameter kit designating unit 14 described later to notify the mesh dividing unit 13 of the selected parameter kit (the function performed according to the above instruction (21)),

(32) a function of selecting a parameter kit modified by the modification unit 15 described later to notify the mesh dividing unit 13 of the selected parameter kit(the function performed according to the above instruction (22)), and

(33) a function of automatically selecting a parameter kit based on three-dimensional CAD data to notify the mesh dividing unit 13 of the selected parameter kit (the function performed according to the above instruction (24)).

When the selecting unit 12 performs the above function (33), as described later with reference to FIGS. 10 to 17, it computes the shape-feature information (the scale of an analytical target model and the volume distribution in the analytical target model in this embodiment) and physical-property-feature information (the thermal conductivity distribution in an analytical target model in this embodiment) of an analytical target model or the components of the analytical target model, and selects a parameter kit corresponding to the computed shape-feature information and physical-property-feature information, as the selected parameter from the library 20, using a parameter kit selection screen described later with reference to FIG. 16 and a selection table described later with reference to FIG. 17.

The mesh dividing unit 13 performs, based on a parameter kit selected by the selecting unit 12 (selected parameter kit) and three-dimensional CAD data, a mesh dividing process so as to divide an analytical model into cuboids of less than or equal to the maximum number of cuboids included in the selected parameter kit.

The parameter kit designating unit 14 notifies, according to the above instruction (21) which the user has input by operating the input unit 40 while referring to a display provided by the display 30, designation information to the selecting unit 12 in order to designate at least one of the two or more kinds of parameter kits stored in the library 20.

The modification unit 15 modifies, according to the above instruction (22) which the user has input by operating the input unit 40 while referring to a display provided by the display 30, the contents of a parameter kit designated by the parameter kit designating unit 14.

The saving control unit 16 causes to affect/store, according to the above instruction (23) which the user has input by operating the input unit 40, the contents of a parameter kit modified by the modification unit 15 into the library 20. At that time, the corresponding parameter kit in the library may be over written with the contents obtained after the modification, or the parameter kit obtained after the modification may be additionally stored in the library 20 as a new parameter kit.

The reference component designating unit 17 designates, according to the above instruction (25) which the user has input by operating the input unit 40 while referring to a display provided by the display 30, a reference component from the components of an analytical target model, and notifies the mesh dividing unit 13 of the information concerning the reference component. The information concerning the components of the analytical target model is extracted from the tree-dimensional CAD data. Further, the mesh dividing unit 13 is configured so as to handle the reference component notified from the reference component designating unit 17 and components smaller than the reference component as exception to target for the mesh dividing process. At that time, the mesh dividing unit 13 handles a component of which at least one of the maximum outer dimensions in the three axial directions is less than or equal to the corresponding one of the maximum outer dimensions in the three axial directions of the reference component, as exception to target for the mesh dividing process. The reference component will be described later with reference to FIGS. 18A to 18C.

The conversion time estimating unit 18 is started in accordance with the above instruction (26) which the user has input by operating the input unit 40, and estimates, based on a selected parameter kit selected by the selecting unit 12, a conversion time required for the mesh dividing unit 13 to perform a mesh dividing process for an analytical target model. The conversion time estimating unit 18 measures a time required for a simplified mesh dividing process for the analytical target model, the simplified mesh dividing process being performed on the basis of the selected parameter kit, and estimates the conversion time to be a value obtained by multiplying the measured time by a predetermined coefficient. Further, the result of the estimation (conversion time) is displayed on the display 30 as a process outline of the above item (15) (see FIG. 19, for example). Specific operations of the conversion time estimating unit 18 will be described later with reference to FIGS. 19 to 22.

[2] Operation of the Mesh Dividing Device of this Embodiment

Next, the operation of the mesh dividing device of this embodiment configured as described above will be described with reference to FIGS. 2 to 22.

[2-1] System to which the Mesh Dividing Device of this Embodiment is Applied

Figure 2:
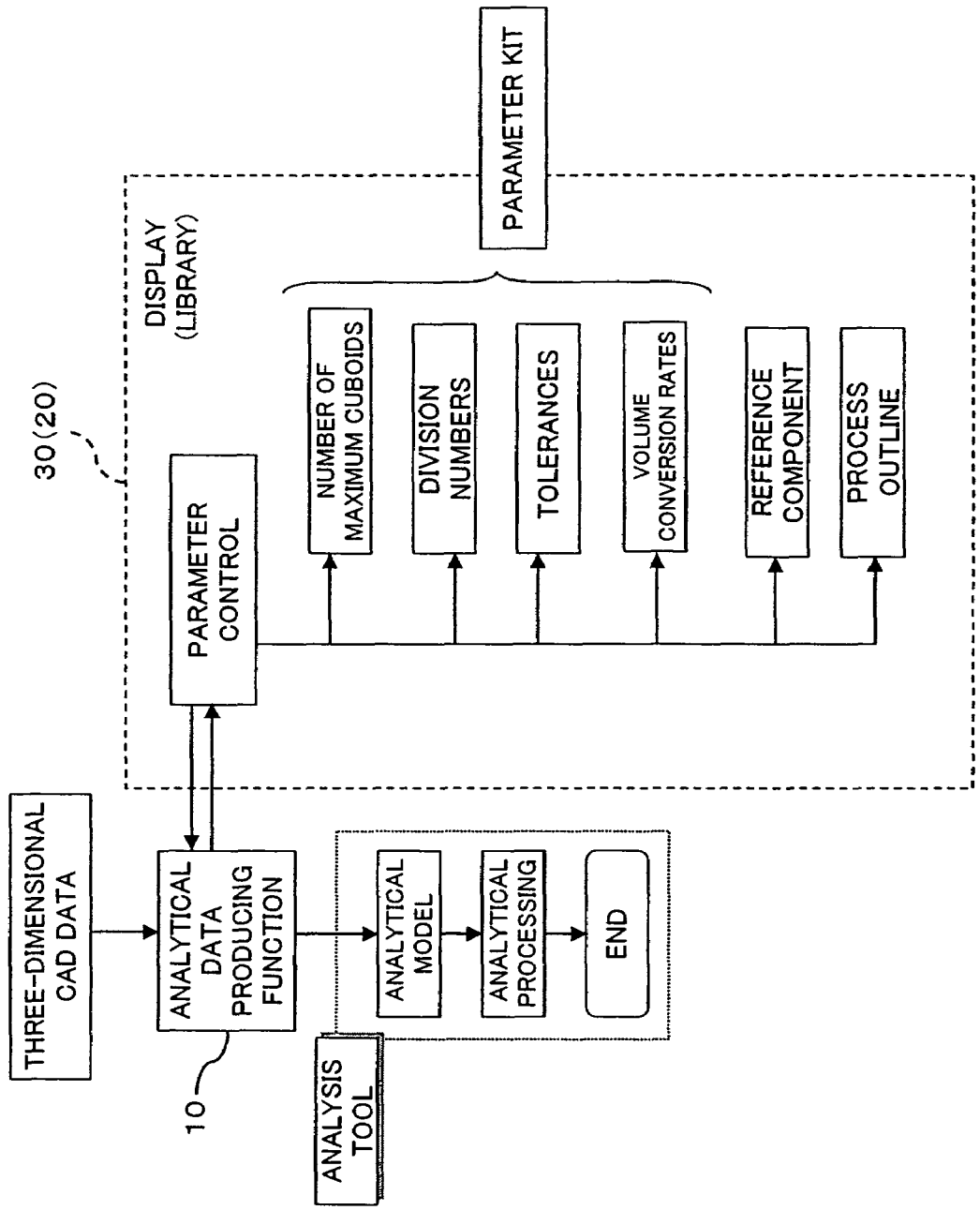
FIG. 2 depicts the flow of the process of a system to which the mesh dividing device of this embodiment is applied.

FIG. 2 depicts the flow of the process of a system to which the mesh dividing device 1 of this embodiment is applied. As shown in FIG. 2, three-dimensional CAD data (geometric data or three dimensional solid model data) obtained by a CAD system (e.g. Pro/E, I-DEAS, Parasolid, AutoCAD, VPS, or the like.) is input to the CPU 10 performing an analytical data producing function, by which an analytical model is produced from the three-dimensional CAD data according to an instruction from the input unit 40. Then, an analytical process by any of various analytical tools (e.g. thermal-fluid analytical software) is performed using the produced analytical model.

When the CPU 10 performs analytical data production (mesh-division), a parameter kit designated and selected (further modified) by the user or a parameter kit automatically selected based on the three-dimensional CAD data is used, and the mesh-division according to the parameters for division-control (mesh-division numbers, tolerances, balanced-volume conversion rate, and unbalanced-volume conversion rate) included in the parameter kit, is performed in order not to exceed the maximum number of cuboids included in the parameter kit.

In the mesh dividing device 1 of this embodiment, two or more kinds of parameter kits are previously stored in the library 20, and the user(operator) who operates the input unit 40 referring to the screen of the display 30, is not only able to designate and select appropriate one of the two or more kinds of parameter kits, and to modify the contents of the selected parameter kit, but also able to instruct the automatic selection of a parameter kit. The functions related to "Reference Component" and "Process Outline" shown in FIG. 2 will be described later.

[2-2] Display Screen for the Contents of a Parameter Kit

FIG. 3 shows an example for the display 30 of the contents of a parameter kit in this embodiment.

On the display screen (cuboid control panel), the display 30 displays, as shown in FIG. 3, the contents (the maximum number of cuboids, the number of the mesh-division numbers, tolerances, balanced-volume conversion rate, and unbalanced-volume conversion rate) of a parameter kit designated and selected or automatically selected, and also displays a "Read" button, a "Save" button, "Refer" button, a "Reference Component" button, and a "Process Outline" button for the user to enter the instructions corresponding to the above items (21) and (23) to (26) using the input unit 40.

Furthermore, for each of the balanced-volume conversion rate and the unbalanced-volume conversion rate, a sliding bar and a triangle button are displayed. The user is able to modify each of the balanced-volume conversion rate and the unbalanced-volume conversion rate by moving the sliding bar or clicking the triangle button through the input unit 40. The user is also able to modify the maximum number of cuboids, the number of the mesh-division, tolerances, balanced-volume conversion rate, and unbalanced-volume conversion rate to desired values by directly inputting the desired values in the value display windows of the parameters by operating the input unit 40. Such modificating function can be realized, as described above, by the modification unit 15 in accordance with the instruction of the above item (22). The modified contents are saved in the library 20 by the user clicking the "Save" button.

On the display screen (parameter kit) shown in FIG. 3, the maximum number of cuboids is set at "200,000", the number of the mesh-division in the three axial directions (division numbers in X-direction, Y-direction, and Z-direction) are set at "10", "10", and "10" respectively, the tolerances in the three axial directions (tolerances (mm) in X-direction, Y-direction, and Z-direction) are set at "0.5", "0.5", and "0.5" respectively, the balanced-volume conversion rate is set at "0.5", and the unbalanced-volume conversion rate is set at "0.7".

The maximum number of cuboids, mesh-division numbers, tolerances, balanced-volume conversion rate, and unbalanced-volume conversion rate included in the parameter kit of this embodiment will be described below with reference to FIGS. 4 to 8 respectively.

[2-2-1] Maximum Number of Cuboids

Figure 4A:
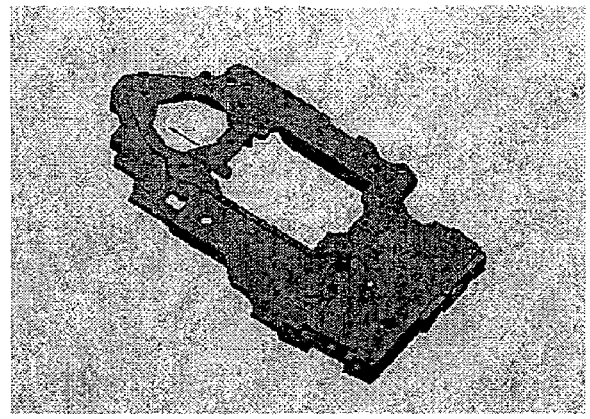
FIGS. 4A to 4C are figures for illustrating the maximum number of cuboids.
Figure 4B:
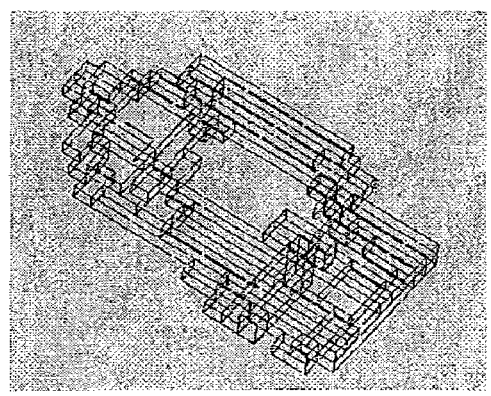
Figure 4C:
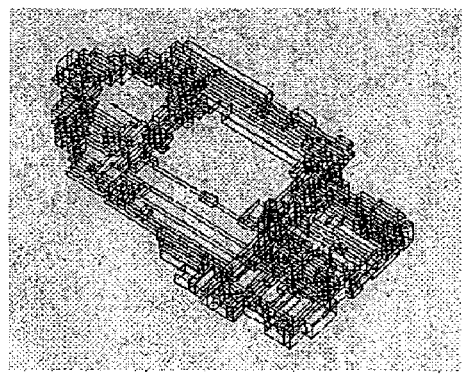

FIGS. 4A to 4C are figures for description of maximum numbers of cuboids: FIG. 4A shows an example of an analytical target model provided as three-dimensional CAD data; FIG. 4B shows a state that the analytical target model shown in FIG. 4A is divided using the maximum number of cuboids of 30; and FIG. 4C shows a state that the analytical target model shown in FIG. 4A is divided using the maximum number of cuboids of 150. The analytical target model shown in FIG. 4A is, for example, a component which is part of an MO driver.

A maximum number of cuboids is a parameter for instructing that an analytical target model is divided simply to what extent or in detail to what extent.

For example, when the maximum number of cuboids for the component shown in FIG. 4A is set at 30, the component is divided simply into cuboids of less than or equal to 30, as shown in FIG. 4B, by a function of the CPU 10 as the mesh dividing unit 13. Further, when the maximum number of cuboids for the same component is set at 150, the component is divided in detail into cuboids of less than or equal to 150 as shown in FIG. 4C.

As described above, in case that the maximum number of cuboids is smaller, the number of cuboids obtained by dividing the analytical target model is smaller, and thereby the analytical processing speed becomes higher but the analytical accuracy becomes lower. On the contrary, in case that the maximum number of cuboids is larger, the number of cuboids obtained by dividing the analytical target model is larger, and thereby the analytical accuracy becomes higher but the analytical processing speed becomes lower. In this embodiment, the user selects a parameter kit including a suitable maximum number of cuboids from the two or more kinds of parameter kits, or modifies the maximum number of cuboids to a value desired by the user on the display screen as shown in FIG. 3, in order to obtain a desired analytical accuracy and analytical processing speed.

[2-2-2] Number of Mesh-division

Figure 5:
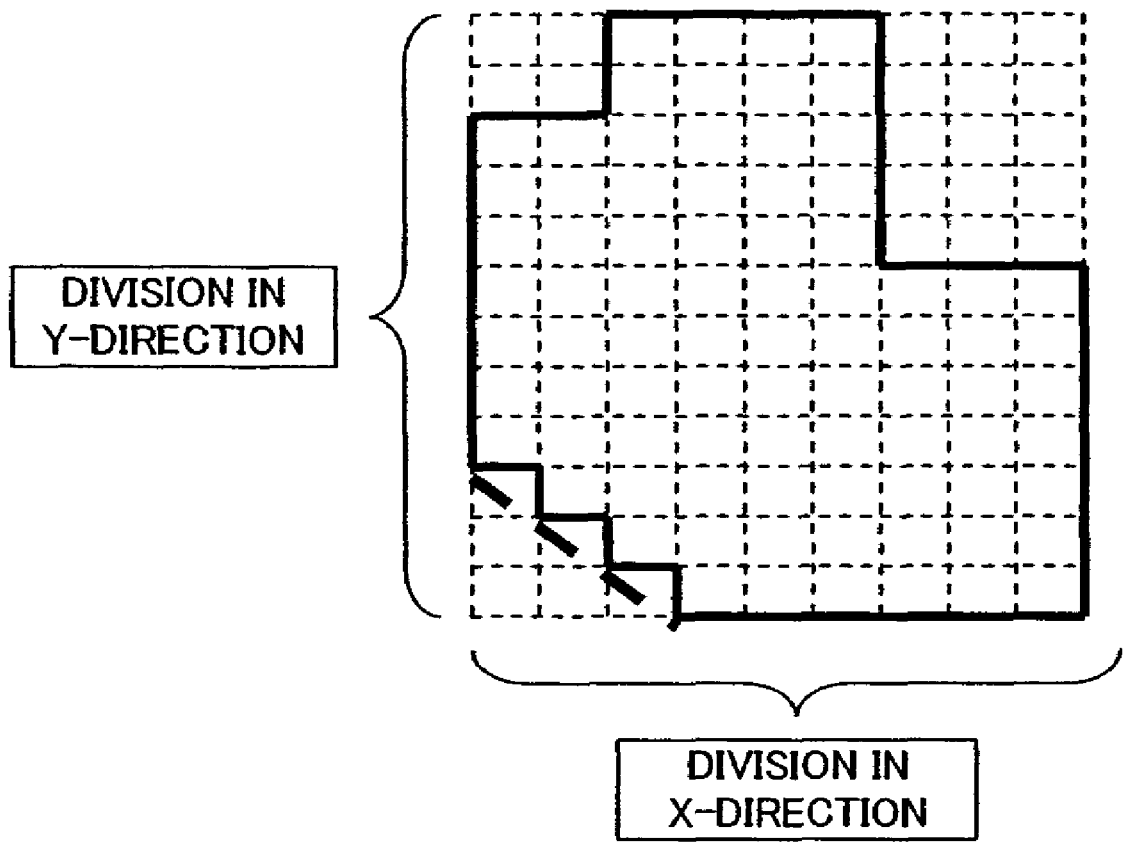
FIG. 5 is a figure for illustrating the number of the mesh-division in the three axial directions.

FIG. 5 is a figure for description of the number of the mesh-division in the three axial directions (division numbers in X-direction, Y-direction, and Z-direction).

For a parameter kit, the number of mesh-division in the three axial directions are set as division control parameters as shown in FIG. 5, in which the number of the mesh-division in the two axial directions, X-direction and Y direction, are shown. In the example shown in FIG. 5, the number of the mesh-division in X-direction is set at "9", and the number of the mesh-division in Y-direction is set at "12" for the analytical target model (component) shown with thick solid lines. Only the number of the mesh-division in X-direction and Y-direction are explained here, but the number of the mesh-division in Z-direction is also set in the same manner.

Like maximum numbers of cuboids, number of the mesh-division in the three axial directions described above are also parameters for instructing that the analytical target model is divided simply to what extent or in detail to what extent.

The mesh dividing unit 13 performs a mesh dividing process for an analytical target model so as to divide the analytical target model into cuboids of less than or equal to a maximum number of cuboids described above according to the number of the mesh-division in the three axial directions which have been set.

[2-2-3] Tolerance

Figure 6A:
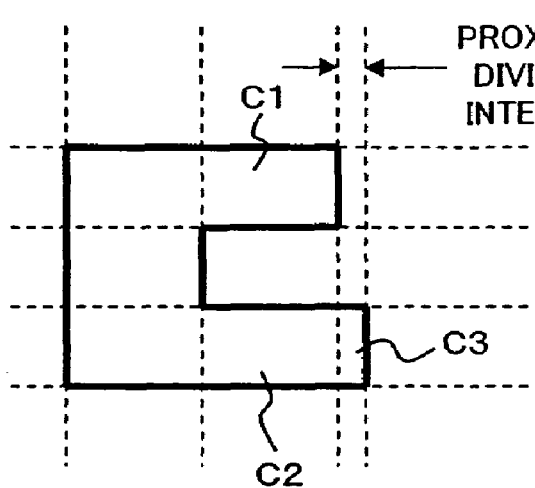
FIGS. 6A and 6B are figures for illustrating the tolerances in the three axial directions.
Figure 6B:
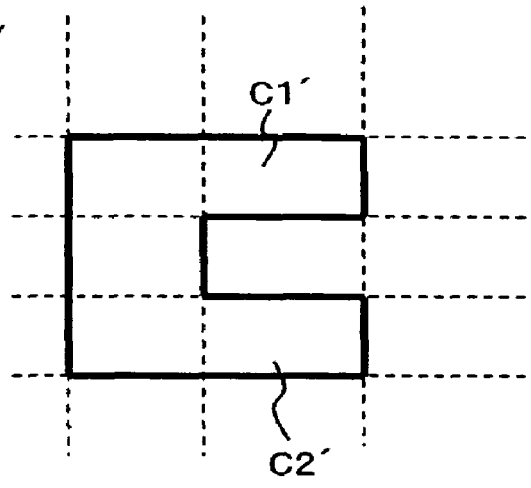

FIGS. 6A and 6B are figures for explanation of tolerances in the three axial directions (tolerances in X-direction, Y-direction, and Z-direction). In FIGS. 6A and 6B, the thick solid line frame indicates the shape of an analytical target model (component).

For a parameter kit, tolerances in the three axial directions are set as division control parameters as shown in FIG. 3 (the unit is mm, for example; each of the tolerances of the example shown in FIG. 3 is set at 0.5 mm).

When a mesh dividing process is performed, as shown in FIG. 6A for example, the interval between vertexes of adjacent cuboids (proximity division interval; the interval between vertexes of the cuboid C1 or C2 and the cuboid C3) is obtained on each of the three axial directions, and it is determined whether the interval is less than or equal to the tolerance which has been set on each of the three axial directions. When the interval is more than the tolerance, a special processing is not executed, and when the interval is less than or equal to the tolerance, the cuboid C3 the interval for which is less than or equal to the tolerance is merged into the adjacent larger cuboid C2 to produce a new cuboid C2' as shown in FIG. 6B. At that time, the cuboid C1 having the same size as the cuboid C2 is also modified to the cuboid C1' having the same size as the cuboid C2' obtained after the merging. That is, the mesh is modified so as to absorb the cuboids C3 the intervals for which are less than or equal to the tolerance, and cuboids are produced according to the modified mesh.

Consequently, small cuboids the intervals for which are each less than or equal to the tolerance are merged.

FIGS. 6A and 6B depicts the tolerance in one direction only. However, a tolerance is provided in any of the three directions in the same manner as described above, and a merging process is performed according to the tolerance by the mesh dividing unit 13.

[2-2-4] Balanced-volume Conversion Rate

FIGS. 7A and 7B depict a balanced-volume conversion rate.

For a parameter kit, a balanced-volume conversion rate as shown in FIG. 3 is set as a division control parameter (the conversion rate of the example in FIG. 3 is set at 0.5). In FIGS. 7A and 7B, a thick solid line frame indicates the shape of an analytical target model (component).

When a mesh dividing process is performed, as shown in FIG. 7A for example, a ratio between the volume of each of the cuboids produced by performing balanced mesh-division and the volume of the unit of cuboid (the unit of mesh-division) for the balanced mesh-division is obtained, and it is determined whether the ration is less than or equal to a balanced-volume conversion rate which has been set as a parameter. When the ration is less than or equal to the balanced-volume conversion rate, the cuboid is deleted, and when the ratio is more than the balanced-volume conversion rate, the cuboid is enlarged to the unit of cuboid. That is, each of the cuboids obtained by the balanced mesh-division is deleted or enlarged according to the proportion of the cuboid to the unit of cuboid.

For example, any of the cuboids C11, C12, and C13 shown in FIG. 7A is smaller than the unit of cuboid (the unit of volume partitioned by the mesh shown with dotted lines), and the volume ration of the cuboid C11 is less than or equal to the balanced volume conversion rate (e.g. 0.5), and each of the volume ratios of the cuboids C12 and C13 is more than the balanced volume conversion rate (e.g. 0.5). In this case, as shown in FIG. 7B, the cuboid C11 is deleted, and the cuboids C12 and C13 are each enlarged to the unit of volume, and are modified to the new cuboids C12' and C13' respectively.

[2-2-5] Unbalanced-volume Conversion Rate

Figure 8A:
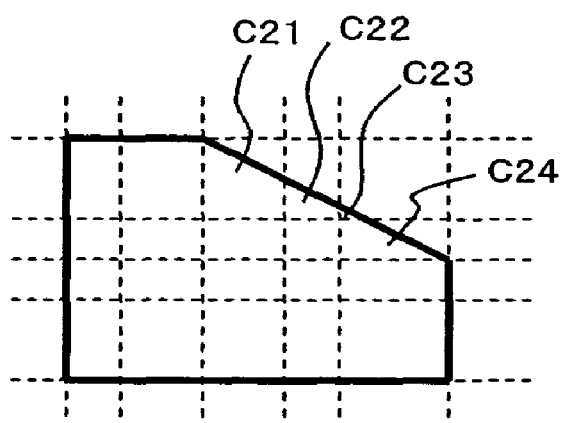
FIGS. 8A and 8B are figures illustrating an unbalanced-volume conversion rate.
Figure 8B:
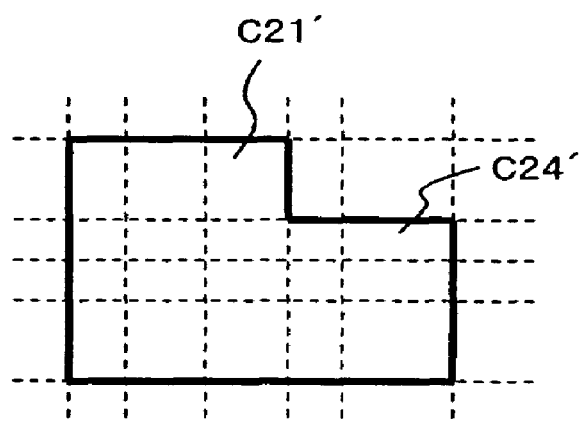

FIGS. 8A and 8B depict an unbalanced-volume conversion rate. In FIGS. 8A and 8B, a thick solid line frame indicates the shape of an analytical target model (component).

When a mesh dividing process is performed, as shown in FIG. 8A for example, a ratio between the volume of each of the division parts obtained by performing unbalanced mesh-division and the volume of the unit of mesh-division to which each division part belongs is obtained, and it is determined whether the ration is less than or equal to an unbalanced-volume conversion rate which has been set as a parameter. When the ration is less than or equal to the unbalanced-volume conversion rate, the division part is deleted, and when the ratio is more than the unbalanced-volume conversion rate, the division part is enlarged to the unit of mesh-division to which each division part belongs. That is, each of the division parts obtained by the unbalanced mesh-division is deleted or enlarged according to the proportion of the division part to the unit of mesh-division.

For example, any of the division parts C21, C22, C23, and C24 shown in FIG. 8A is smaller than the unit of mesh-division (the unit of volume partitioned by the mesh shown with dotted lines), and any of the volume rations of the division parts C22 and C23 is less than or equal to the unbalanced volume conversion rate (e.g. 0.7), and each of the volume ratios of the division parts C21 and C24 is more than the unbalanced volume conversion rate (e.g. 0.7). In this case, as shown in FIG. 8B, the division parts C22 and C23 are deleted, and the division parts C21 and C24 are each enlarged to the unit of mesh-division, and are modified to the cuboids C21' and C24' respectively.

[2-3] Functions of Designated Reading/Modifying/Storing/Automatically Selecting a Parameter Kit Next, the functions of designated reading (Read)/modifying/storing (Save)/automatically selecting (Refer) a parameter performed by the mesh dividing device 1 of this embodiment will be described with reference to FIGS. 9 to 17.

Figure 9:
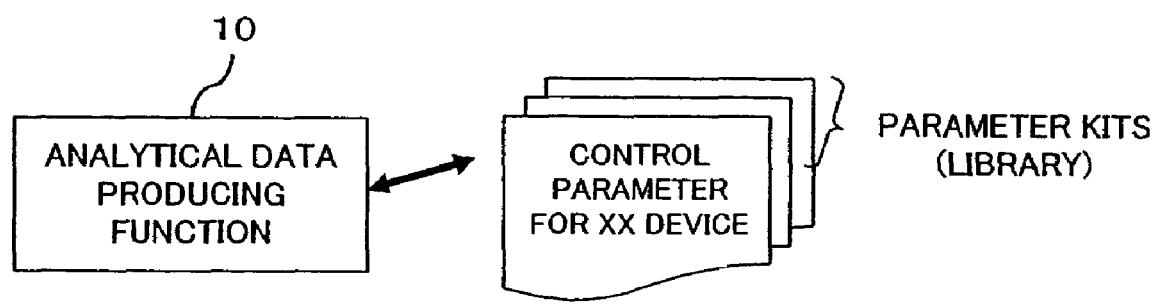
FIG. 9 is figure illustrating the parameter kits of this embodiment.

FIG. 9 depicts the parameter kits of this embodiment. As shown in FIG. 9, two or more kinds of parameter kits (control parameters for XX device, etc.) are stored in the library 20 every devices each capable of being an analytical target model, or in accordance with various forms or various characteristics. In the CPU 10 for performing the analytical data producing function, a parameter kit designated by the parameter kit designating unit 14 according to the operation of the input unit 40 (the operation of the "Read" button) performed by the user is selected by the selecting unit 12, and mesh-division based on the parameter kit is performed by the mesh dividing unit 13.

The contents of the parameter kit (various parameter values) designated like this are displayed on the display screen (cuboid control panel) of the display 30 as shown in FIG. 3, and can be modified to desired values by the modification unit according to the operation of the input unit 40 performed by the user. The modified contents can be stored in the library 20 by operating the "Save" button, and the stored contents can be used as initial values at the next start of the system. On the display screen (cuboid control panel) of the display 30, the user is able to input and create new parameter kits by operating the input unit 40. The parameter kits newly created like this can be stored in the library 20 by operating the "Save" button.

Furthermore, the user is able to instruct the selecting unit 12, by clicking the "Refer" button on the display screen (cuboid control panel) of the display 30, to perform a parameter kit automatically selecting process (recommended value selecting process). The parameter kit automatically selecting process (recommended value selecting process) is described below with reference to FIGS. 10 to 17.

Figure 10:
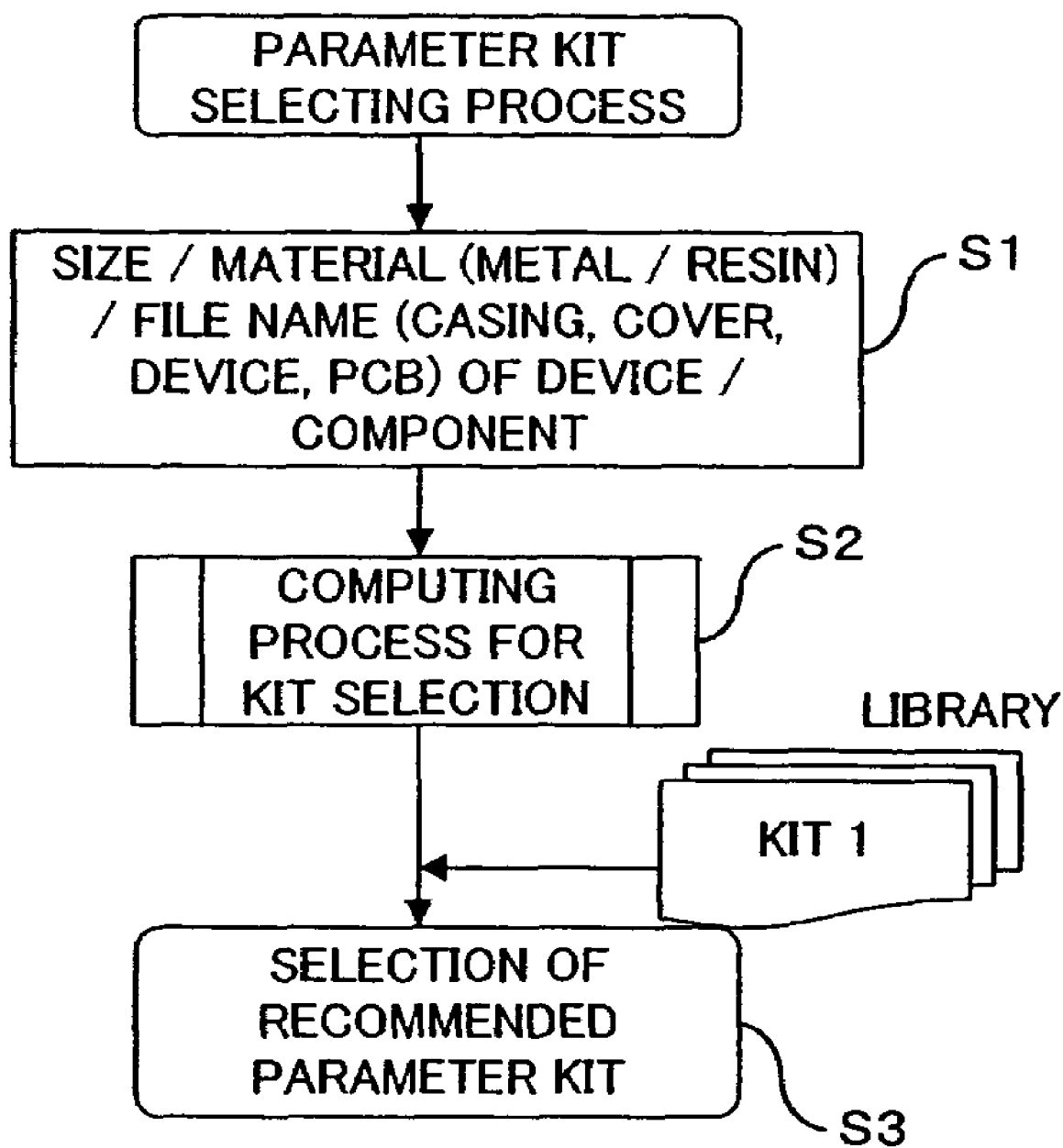
FIG. 10 is a flow chart illustrating the procedure of the parameter kit selection process of this embodiment.

FIG. 10 is a flow chart (steps S1 to S3) illustrating the procedure of the parameter kit selecting process of this embodiment. As shown in FIG. 10, When the selecting unit 12 receives an instruction for performing the parameter kit automatically selecting process, it extracts, when reading the three-dimensional CAD data, the sizes, materials (metal/resin), and file names (casing, cover, device, PCB) of the device (component) which is an analytical target model (step S1), performs the computing process for parameter kit selection based on the extracted contents (step S2), and automatically selects recommended values, i.e. a parameter kit most suitable for the device from the two or more kinds of parameter kits and assigns it to the device (step S3). Such assignment of a parameter kit may be performed for the whole of the device, for the top assembly and/or subassemblies, or for every component.

Figure 11C:
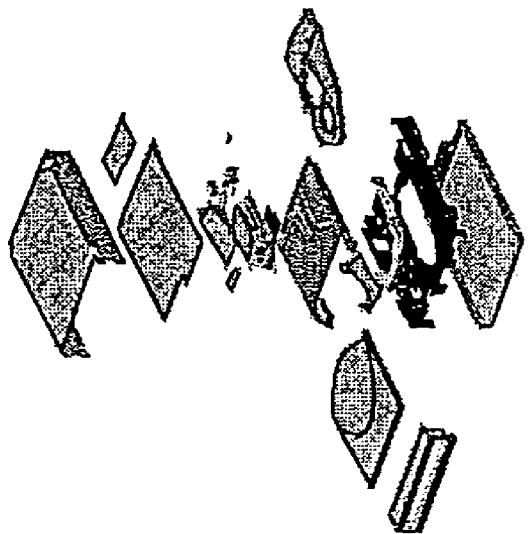
FIGS. 11A to 11C show an example of three-dimensional CAD data.
Figure 11B:
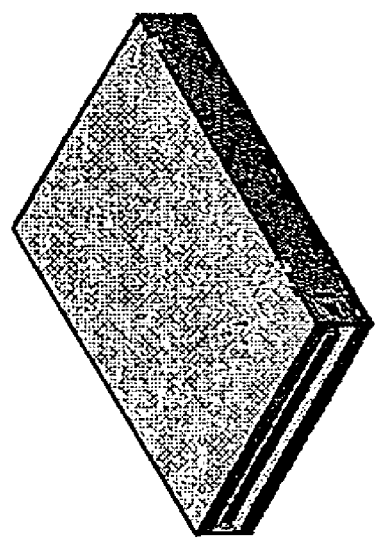
Figure 11A:
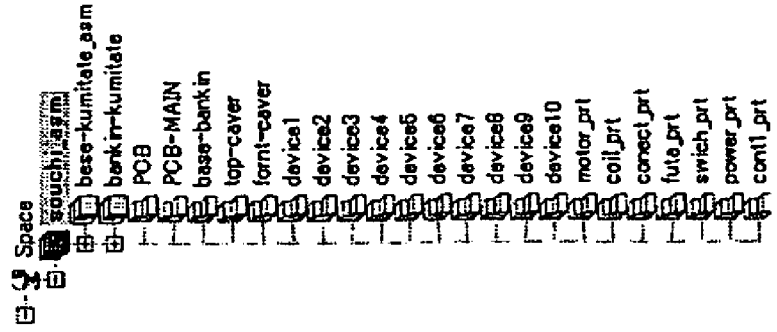

FIGS. 11A to 11C show examples of three-dimensional CAD data: FIG. 11A shows a configuration tree of the three-dimensional CAD data; FIG. 11B is a perspective view of the analytical target model device provided by the three-dimensional CAD data; and FIG. 11C is an exploded perspective view of the device shown in FIG. 11B. On the display 30, three-dimensional CAD data externally input can be displayed in the states shown in FIGS. 11A to 11C.

In step S1 of FIG. 10, the sizes, materials (metal/resin), and file names (casing, cover, device, PCB) of the device (component) which is an analytical target model are extracted from the three-dimensional CAD data having a configuration tree as shown in FIG. 11A, and, for example, tables A and B as shown in FIGS. 12 and 13 respectively are created. FIG. 12 shows an example of a dimension table A obtained from the three-dimensional CAD data in this embodiment. FIG. 13 shows an example of a physical property value table B obtained from the three-dimensional CAD data in this embodiment.

The dimension table A shown in FIG. 12 contains information about the sizes of the device which is an analytical target model and the sizes of the components of the device, that is, contains the number of components of the device (45 in this table), the maximum outer sizes in X-direction, Y-direction, and Z-direction of each of the components (sizes of 45 components in this table), and the maximum outer sizes in X-direction, Y-direction, and Z-direction of the device.

The physical property value table B shown in FIG. 13 contains information about the physical property values of the components constituting the device which is an analytical target model, that is, contains the name, material, and physical property values 1, 2, and 3 of each of the components. The physical property values include, for example, thermal conductivities, specific heats, and densities.

Next, the procedure of the computing process for parameter kit selection in step S2 of FIG. 10, using the dimension table A and the physical property value table B created as described above, performed by the selecting unit 12, will be described according to the flow chart (steps S11 to S15) of FIG. 14. In this flow, it is assumed that mesh division of the analytical target model has been performed in order to analyze the behavior of thermal fluid (steady-state) in the analytical target model.

Figure 15A:
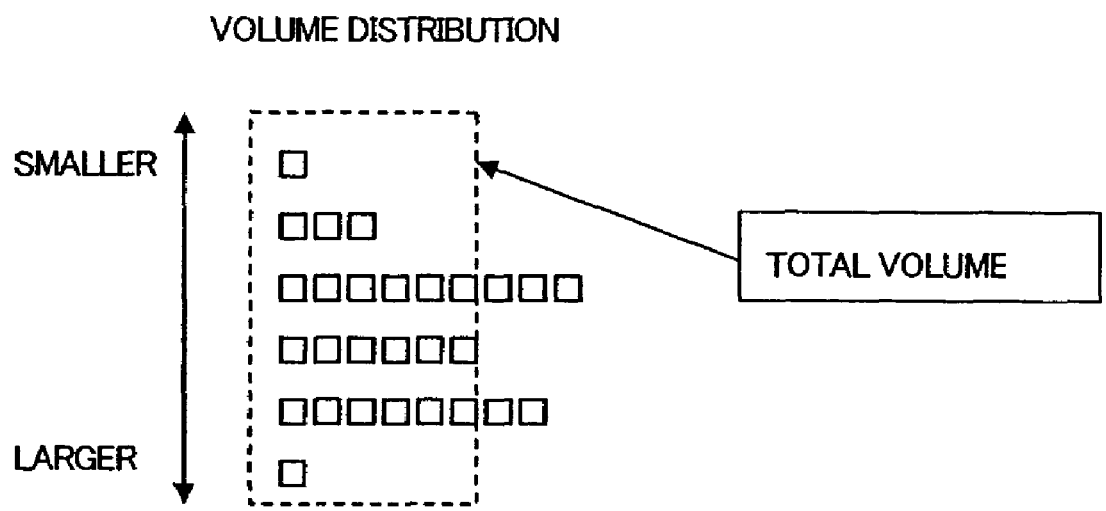
FIGS. 15A and 15B depict an example of volume distribution and an example of thermal conductivity distribution respectively computed in this embodiment.

At first, the sizes of the device and the sizes of the components are extracted from the dimension table A (step S11), and then volume of the whole of the device, volumes of the components, and proportions of the components to the volume of the whole of the device, are computed based on the extracted sizes to obtain a volume distribution as shown in FIG. 15A (step S12). By means of the volume distribution obtained as shown in FIG. 15A, the volume of the whole of the device (i.e. the scale of the device) and the density of the device (i.e. implementation form) can be determined.

Figure 15B:
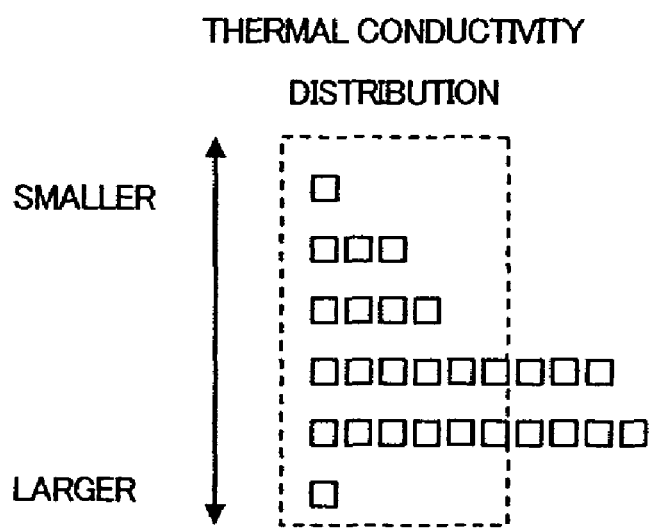

After that, thermal conductivities of the components are extracted from the physical property value table B (step S13), and then a thermal conductivity distribution as shown in FIG. 15B is obtained based on the extracted thermal conductivities (step S14). By means of the thermal conductivity distribution obtained as shown in FIG. 15B, the thermal conductivity of the whole of the device can be determined.

Then, the scale and implementation form of the device are determined based on the volume distribution obtained in step S12, and the thermal conductivity is determined from the thermal conductivity distribution obtained in step S14 (step S15).

At that time, the scale of the device is determined, for example, on a scale of 1 to 5 (large-sized server, small/medium-sized device, personal computer, magnetic disk, and mobile telephone), and the implementation form of the device is determined, for example, on a scale of 1 to 3 (high density, medium density, and low density). The determinations may be automatically performed using software by the selecting unit 12 based on the volume distribution obtained as shown in FIG. 15A, or may be performed by the user who has referred to the volume distribution displayed on the display 30. In case that the user performs the determinations, the user inputs the results of the determinations from a parameter kit selection screen described later by operating the input unit 40 while referring to FIG. 16. The scale of the device may be determined based on not the volume distribution but the information about the device included in the three-dimensional CAD data.

Similarly, the thermal conductivity is determined, for example, on a scale of 1 to 3 (high conductivity, medium conductivity, and low conductivity). The determination may be automatically performed using software by the selecting unit 12 based on the thermal conductivity distribution obtained as shown in FIG. 15B, or may be performed by the user who has referred to the thermal conductivity distribution displayed on the display 30. In case that the user performs the determination, the user inputs the result of the determination from a parameter kit selection screen described later by operating the input unit 40 while referring to FIG. 16.

When the user inputs the results of the determinations, a parameter kit selection screen as shown in FIG. 16, for example, is displayed on the display 30, and the user marks the checkboxes corresponding to the results of the determinations by operating the input unit 40 while referring to the selection screen to input the results of the determinations. On this selection screen, checkboxes for 5 levels of device scale i.e. large-sized server, small/medium-sized device, personal computer, magnetic disk, and mobile telephone, checkboxes for 3 levels of implementation form i.e. high density, medium density, and low density, and checkboxes for 3 levels of thermal conductivity i.e. high conductivity, medium conductivity, low conductivity, and nonconductivity are displayed. On the selection screen shown in FIG. 16, the checkbox of "small/medium device" is marked as the scale of the device, the checkbox of "high density" is marked as the implementation form of the device, and the checkbox of "high density" is marked as the thermal conductivity of the device.

When the determinations have been automatically performed by the selecting unit 12, the results of the determinations are notified to the user by displaying a selection screen as shown in FIG. 16 on the display 30.

When the user refers to the results of the determinations (results of check) displayed on the selection screen, and clicks the "Select" button on the selection screen if selecting a parameter kit corresponding to the results of the determinations. When the "Select" button is clicked, the selection process in step S3 of FIGS. 10 and 14 is performed.

The selection screen shown in FIG. 16 can be edited at any time by clicking the "Edit" button, and checkboxes, etc. corresponding to new determination criteria can be registered and added at any time.

FIG. 17 shows an example of a parameter kit selection table stored in the library 20 of this embodiment. In the library 20 of this embodiment, each of two or more kinds of parameter kits is previously classified and stored, in the form of a parameter kit selection table as shown in FIG. 17, in correspondence with levels of device scale, implementation density, and thermal conductivity which are assumed for various analytical target models. For example, in the table shown in FIG. 17, the parameter kit 1 is registered in correspondence with an analytical target model of large-sized server, low density, and high conductivity, the parameter kit 2 is registered in correspondence with an analytical target model of small/medium device, high density, and high conductivity, and the parameter kits 3 and 4 are registered similarly in correspondence with their respective levels.

Figure 14:
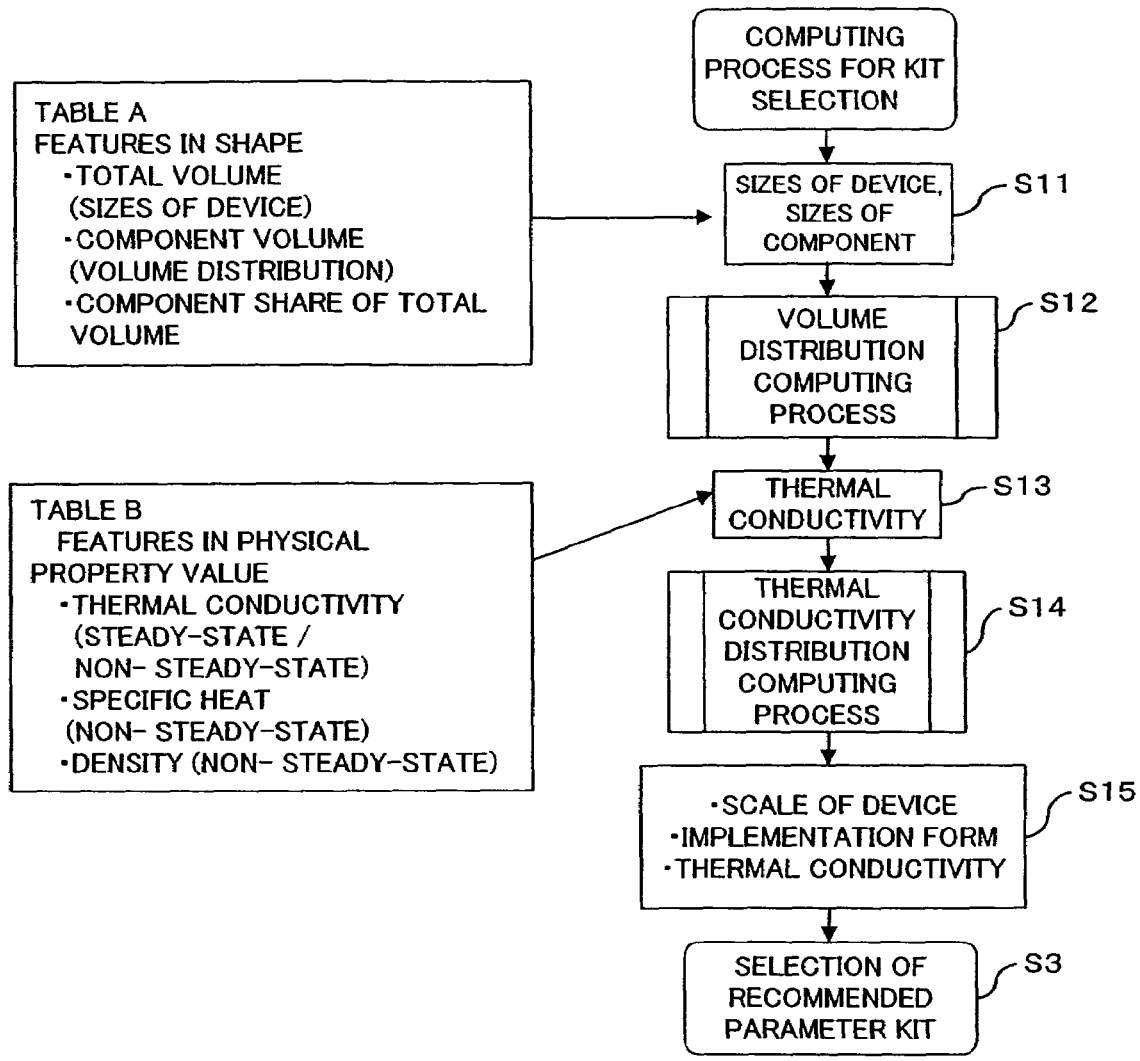
FIG. 14 is a flow chart illustrating the procedure of the computing process for parameter kit selection of this embodiment.

In the selection process in step S3 of FIGS. 10 and 14, the results of the automatic determinations, or the results of the determinations (results marked by the user) which has been input from the selection table shown in FIG. 16 is compared with the parameter kit selection table shown in FIG. 17, and a parameter kit matching with the results of the determination is automatically selected, read from the library kit, and notified to the mesh dividing unit 13. For example, when the results of the determination is, as shown in FIG. 16, "small/medium device", "high density", and "high conductivity", the parameter kit 2 to which "small/medium device", "high density", and "high conductivity" are marked in the table shown in FIG. 17, is automatically selected.

[2-4] Reference Component Designating Function

FIGS. 18A to 18C depict the reference components designating function in this embodiment: FIG. 18A shows an example of a reference component; FIG. 18B shows the largest outline shape of the reference component shown in FIG. 18A; and FIG. 18C shows the maximum outer sizes obtained on the reference component shown in FIG. 18A.

When the user clicks the "Reference Component" button on the display screen shown in FIG. 3, for example, a screen of a configuration tree as shown in FIG. 11A or a screen of components as shown in FIG. 11C is displayed on the display 30. When the user clicks one of the components shown on the screen, the clicked component is designated by the reference component designating unit 17 as a reference component and it is noticed to the mesh dividing unit 13.

When the component shown in FIG. 18A, for example, is designated as a reference component by such operation, in the mesh dividing unit 13, the largest outline shape of the reference component is obtained as shown in FIG. 18B, and by means of the largest outline shape, the maximum outer sizes in the three axial directions (maximum X-value, maximum Y-value, and maximum Z-value) as shown in FIG. 18C, is extracted.

The maximum outer sizes in the three axial directions (maximum X-value, maximum Y-value, and maximum Z-value) extracted as mentioned above are used as criteria of which the mesh dividing unit 13 performs a determination in a simplifying process. That is, the mesh dividing unit 13 handles a component of which at least one of the maximum outer dimensions in the three axial directions is less than or equal to the corresponding one of the maximum outer dimensions in the three axial directions of the reference component, as exception to target for the mesh dividing process, in order to simplify the mesh dividing process.

[2-5] Displaying Function of Process Outline (Estimating Function of Conversion Time)

When the user clicks the "Process Outline" button on the display screen shown in FIG. 3, the conversion time estimating unit 18 is started, and a conversion time (index of the processing time concerning to producing cuboids), when the contents of the parameter kit (designated contents) displayed on the displaying screen as shown in FIG. 3 is used, is schematically estimated. The estimated conversion time is displayed, for example, as a process outline screen on the display 30 as shown in FIG. 19.

FIG. 19 shows an example of a process outline displayed on the display 30 in this embodiment. In this example shown in FIG. 19, a maximum number of cuboids (xxxx), the number of the mesh-division in the three axial directions (division in X-direction: XX, division in Y-direction: YY, and division in Z-direction: ZZ), and a total number of divisions (total number of division parts including spatial parts obtained by simply multiplying the number of the mesh-division XX, YY, and ZZ together) are displayed in addition to the estimated conversion time.

Figure 20:
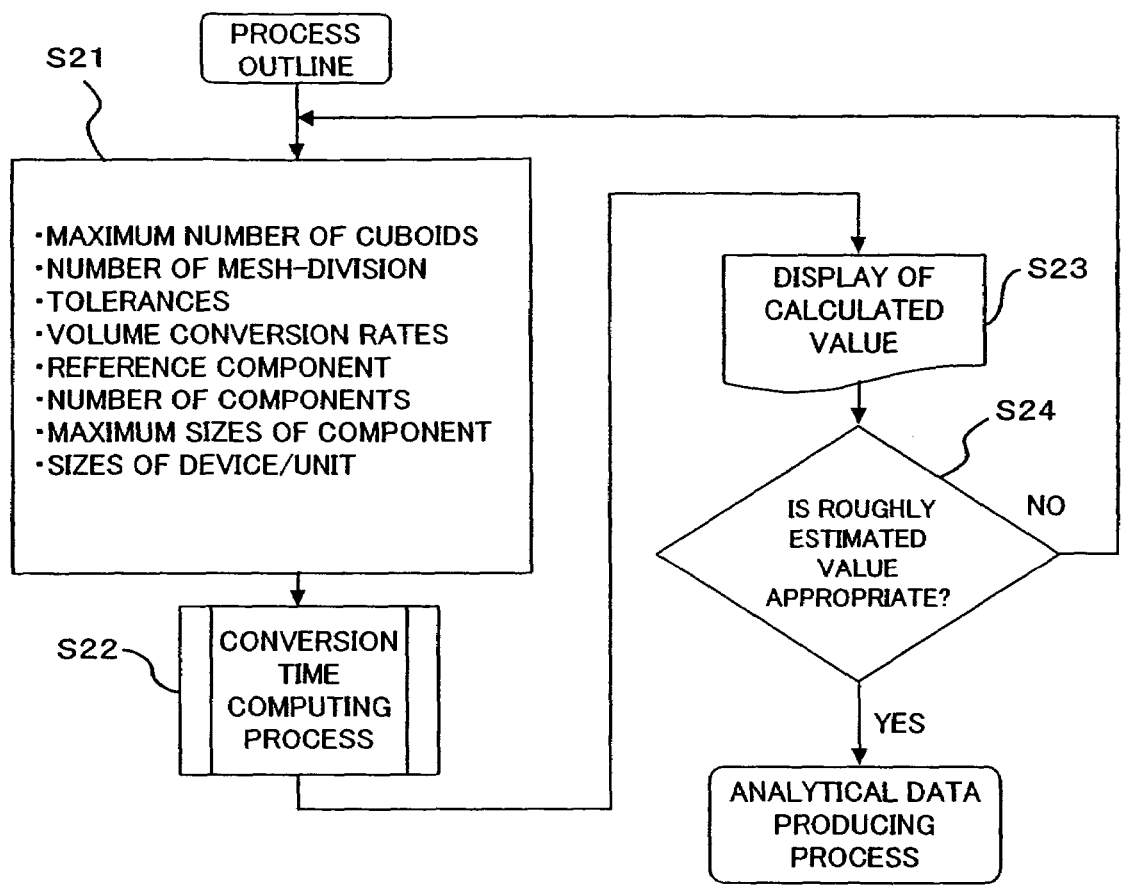
FIG. 20 is a flow chart illustrating the procedure of the process outline displaying process of this embodiment.
Figure 22:
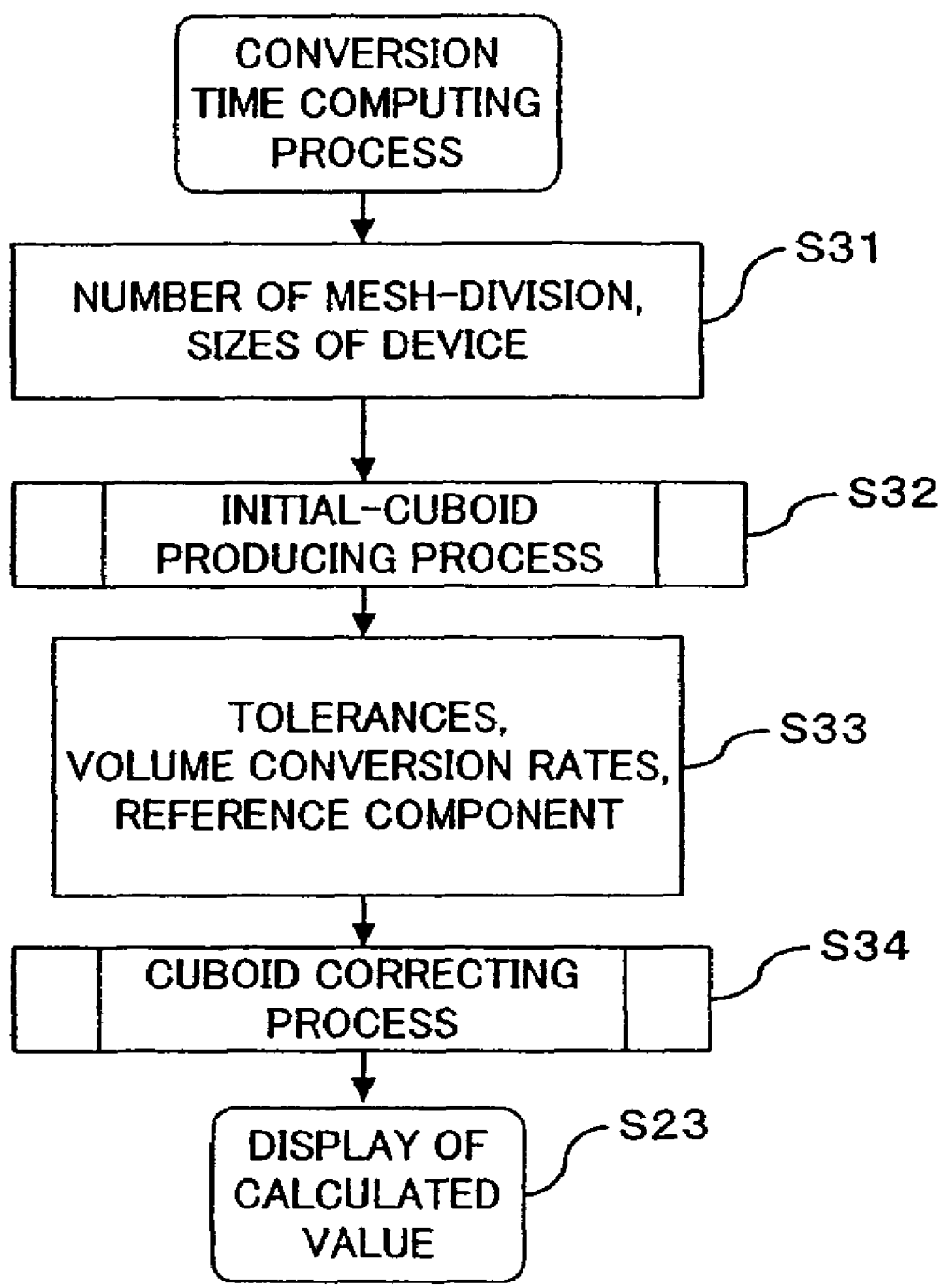
FIG. 22 is a flow chart illustrating the procedure of the conversion time computing process of this embodiment.

Next, the procedure of the process outline displaying process of this embodiment and the procedure of the conversion time computing process performed by the conversion time estimating unit 18, will be described with reference to FIGS. 20 to 22. FIG. 20 is a flow chart (steps S21 to S24) illustrating the procedure of the process outline displaying process of this embodiment. FIG. 21 shows an example of a parameter table including information about a parameter kit and reference component selected in this embodiment. FIG. 22 is a flow chart (steps S31 to s34) illustrating the procedure of the conversion time computing process of this embodiment.

When the "Process Outline" button is clicked on the display screen shown in FIG. 3, a parameter table C as shown in FIG. 21 is created based on the contents of the parameter kit which have been displayed on the display screen shown in FIG. 3 and the extracted contents of the reference component. The maximum number of cuboids, the number of the mesh-division, the tolerances, the balanced-volume conversion rate, the unbalanced-volume conversion rate, and the sizes of the reference component are extracted from the parameter table C, and the number of the components, the maximum sizes of the components, and the sizes of the device are extracted (step S21) from the dimension table A described above. A conversion time is estimated, based on the extracted various information, by the conversion time estimating unit 18 (step S22). The conversion time computing process in step S22 will be described later with reference to FIG. 22.

When a conversion time (approximate value) is computed, a process outline screen containing the conversion time as shown in FIG. 19 is displayed on the display 30 (step S23). The user who has referred to this process outline screen determines whether the conversion time is appropriate (step S24). When the user determines that the conversion time is not appropriate (in case of NO in step S24), the process returns to step S21, in which the setting on the parameter is changed, and then the same process is repeatedly performed until the user determines that the parameter is appropriate in step S24. When the user determines that the parameter is appropriate (in case of YES in step S24), an analytical data producing process (mesh dividing process) is performed using the parameter extracted (or the setting of which has been changed) in step S21.

In step S22 of FIG. 20, an approximate value of the conversion time is computed according to the flow chart shown in FIG. 22. That is, an initial cuboid-producing process is performed based on the number of the mesh-division and the sizes of the device extracted from the tables C and A (or values modified in step S21) (steps S31 and S32). At that time, the space represented by the sizes of the device is divided with the number of the mesh-division to produce cuboids.

Then the correcting process (process for deletion, enlargement, etc. of division parts) is performed for the initial cuboids in accordance with the tolerances, the volume conversion rates, and the sizes of the reference component extracted from the table C (steps S33 and S34). In an actual mesh dividing process, the process, as shown in steps S31 to S34, is repeatedly performed to divide an analytical target model into cuboids of less than or equal to the maximum number of cuboids. However, in this embodiment, the conversion time estimating unit 18 performs the process of steps S31 to S34 (a simplified mesh dividing process) one time only, measures a time required for the process, and estimates a conversion time to be a value obtained by multiplying the measured time by a predetermined coefficient. The estimated conversion time like this is displayed with the process outline screen (step S23 of FIGS. 20 and 22).

Estimation of a conversion time described above may be performed for the whole of the device, or performed every component or on an assembly-by-assembly basis. Furthermore, a predetermined coefficient which is multiplied by a measured time at estimation of a conversion time may be selected in accordance with a device, component, or assembly which is a target for the estimation, from the various predetermined coefficients, which have been prepared, corresponding to the device scales, implementation forms, etc. described above.

[3] Effect of the Mesh Dividing Device of this Embodiment

As described above, according to the mesh dividing device 1 which is an embodiment of the present invention, the user is able to easily and reliably input or designate a maximum number of cuboids and various parameters for division control (the number of the mesh-division in the three axial directions, tolerances in the three axial directions, a balanced-volume conversion rate, and an unbalanced-volume conversion rate) in an interactive manner by operating the input unit 40 while referring to the display 30.

Furthermore, with operating the input unit 40, the user is able to select and designate one (or more) of the two or more parameters previously stored in the library 20, through the selecting unit 12 and the parameter kit designating unit 14, thereby being able to easily and reliably select and determine the optimum maximum number of cuboids corresponding to an analytical target model. Consequently, it is possible to significantly shorten a time required for determining parameters such as a maximum number of cuboids, etc., thus significantly reducing a time required for a mesh dividing process, and it is possible to perform mesh-division corresponding to an analytical target model.

At that time, various information including the contents of the two or more kinds of parameter kits stored in the library 20 is displayed by the display 30, and thereby the user is able to reliably select the optimum maximum number of cuboids while referring to the contents of a selected parameter kit. Furthermore, the user is able to modify, with operating the input unit 40, the contents of a parameter kit displayed on the display to desired values through the modification unit 15, and save the contents obtained after the modification into the library 20 through the saving control unit 16. Consequently, the convenience of the user can be significantly improved.

Furthermore, the user is able to designate, with operating the input unit 40, a reference component from the components of an analytical target model through the reference component designating unit 17, and the mesh generating unit 13 is able to handle the reference component and components smaller than the reference components as exception to target for the mesh generating process. Thus, the shape of the analytical target model is simplified and it can be realized accordingly to simplify the mesh dividing process i.e. and to shorten the processing time in response to the request of the user.

Furthermore, the mesh dividing device 1 has a configuration in which an appropriate parameter is automatically selected by the selecting unit 12 from the two or more kinds of selected parameter kits in the library 20 based on the three-dimensional CAD data, and thus it becomes possible to automatically read and set a parameter kit (optimum control data) specialized for the analytical target model (device) without seeking the user's determination. Consequently, the convenience of the user can be further improved.

Furthermore, in the mesh dividing device 1 of this embodiment, a conversion time required for a mesh generating process is estimated by the conversion time estimating unit 18, and the estimated time is displayed with a process outline screen on the display 30, and thus the user is able to immediately grasp the conversion time i.e. waiting time. Consequently, the convenience of the user can be significantly improved.

[4] Others

The present invention is not limited to the embodiment described above, and may be implemented by modifying the embodiment in various forms within the scope not deviating from the purpose of the present invention.

For example, in the above embodiment, an analytical target model is an MO drive, and thermal-fluid analysis for the analytical target model is performed. The present invention is not limited thereto, and is applied, in the same manner as described above, also in case that an analytical target model is one of various electronic devices such as a printer, notebook personal computer, server, mobile telephone, or the like, and in case that one of various analyses, for example, a numerical analysis such as a structural analysis, mechanism analysis, heat-transfer analysis, fluid analysis, electromagnetic-field analysis, magnetic-field analysis, or the like is performed for the analytical target model, and the same effect as the embodiment described above can be obtained.

Furthermore, the functions described above as the display control unit 11, selecting unit 12, mesh dividing unit 13, parameter kit designating unit 14, modification unit 15, saving control unit 16, reference component designating unit 17, and conversion time estimating unit 18 (the whole or part functions of each unit) are realized by a computer (including a CPU, an information processing device, various terminals) executing a predetermined application program (mesh dividing program). The mesh-division program contains the library 20 described above, and, at the beginning of mesh-division, the library 20 is read from the library 20 and stored in a RAM, ROM, or the like to be used. Along with the performing of the mesh-division, the parameter kits in the library are customized by the operation of the user described above.

The mesh-division program is provided in the form of being recorded in a computer-readable recording medium such as a flexible disk, CD-ROM, CD-R, CD-RW, DVD, or the like. In this case, the computer reads the mesh-division program from the recording medium, and transfers it to and stores it into an internal or external storage device to use it. The mesh-division program maybe recorded into a storage device (recording medium) such as a magnetic disk, optical disk, magneto-optical disk, or the like, and supplied to the computer from the storage device through a communication line.

In this case, the computer conceptually includes hardware and OS (Operating System), consequently it prefers to the hardware operated under the control of the OS. Further, in case that any OS is not required and only an application program operates the hardware, the hardware itself represents the computer. The hardware is provided with at least a microprocessor such as a CPU or the like, and means for reading a computer program recorded in a recording medium. The application program as a mesh-division program includes program code for allowing a computer as described above to perform functions as the display control unit 11, selecting unit 12, mesh dividing unit 13, parameter kit designating unit 14, modification unit 15, saving control unit 16, reference component designating unit 17, and conversion time estimating unit 18. Part of the functions may be realized not by an application program but by OS.

Furthermore, as recording medium described above, one of various kinds of computer-readable mediums may be used such as an IC card, ROM cartridge, magnetic tape, punched card, internal storage device of a computer (memory such as a RAM, ROM, or the like), external storage device, and printed matter or the like on which a code such as a bar code or the like is printed, other than a flexible disk, CD-ROM, CD-R, CD-RW, DVD, magnetic disk, optical disk, or magneto optical disk described above.

INDUSTRIAL APPLICABILITY

As described above, according to the present invention, one desired parameter kit can be selected from the two or more kinds of parameter kits previously stored in the library, and thereby it becomes possible to easily and reliably select and determine the optimum maximum number of cuboids corresponding to an analytical target model.

Consequently, it can be considered that the present invention is preferably applied to automatic conversion software for converting three-dimensional CAD data obtained by a CAD system such as Pro/E, I-DEAS, Parasolid, AutoCAD, VPS, or the like to cuboid data, and the utility of the present invention is extremely high.

What is claimed is:

1. A mesh dividing device for performing a mesh dividing process of an analytical target model provided as three-dimensional CAD data into cuboids for numerical-analysis, comprising:
    a library for previously storing two or more kinds of parameter kits each including a maximum number of cuboids which defines the upper limit of the number of said cuboids and parameters for division-control for dividing said analytical target model into said cuboids;
    a selecting unit for selecting at least one of said two or more kinds of parameter kits stored in said library; and
    a mesh dividing unit for performing a mesh dividing process so as to divide said analytical target model, based on a parameter kit selected by said selecting unit and said three-dimensional CAD data, into cuboids of less than or equal to the maximum number of cuboids included in said selected parameter kit, and
    a conversion time estimating unit for estimating, based on said selected parameter kit, a conversion time required for said mesh dividing unit to perform a mesh dividing process for said analytical target model, wherein said display unit displays said conversion time estimated by said conversion time estimating unit.

2. The mesh dividing device according to claim 1, further comprising a display unit capable of displaying various kinds of information including the contents of said two or more kinds of parameter kits stored in said library, said display unit displaying the contents of said selected parameter kit.

3. The mesh dividing device according to claim 2, further comprising a parameter kit designating unit by which the operator designates one of said two or more kinds of parameter kits stored in said library while referring to a display provided by said display unit, wherein said selecting unit selects a parameter kit designated by said parameter kit designating unit to be said selected parameter kit.

4. The mesh dividing device according to claim 3, further comprising a modification unit by which said operator modifies the contents of a parameter kit designated by said parameter kit designating unit while referring to a display provided by said display unit, wherein said selecting unit selects a parameter kit modified by said modification unit to be said selected parameter kit.

5. The mesh dividing device according to claim 4, further comprising a saving control unit for storing the contents of a parameter kit modified by said modification unit into said library according to an instruction externally given by said operator.

6. The mesh dividing device according to claim 5, further comprising a reference component designating unit by which the operator designates a reference component from the components of said analytical target model while referring to a display provided by said display unit, wherein said mesh dividing unit handles said reference component designated by said reference component designating unit, and a component smaller than said reference component, as exception to target for said mesh dividing process.

7. The mesh dividing device according to claim 6, wherein said mesh dividing unit handles a component of which at least one of the maximum outer dimensions in the three axial directions is less than or equal to the corresponding one of the maximum outer dimensions in the three axial directions of said reference component, as exception to target for said mesh dividing process.

8. The mesh dividing device according to claim 4, further comprising a reference component designating unit by which the operator designates a reference component from the components of said analytical target model while referring to a display provided by said display unit, wherein said mesh dividing unit handles said reference component designated by said reference component designating unit, and a component smaller than said reference component, as exception to target for said mesh dividing process.

9. The mesh dividing device according to claim 8, wherein said mesh dividing unit handles a component of which at least one of the maximum outer dimensions in the three axial directions is less than or equal to the corresponding one of the maximum outer dimensions in the three axial directions of said reference component, as exception to target for said mesh dividing process.

10. The mesh dividing device according to claim 3, further comprising a reference component designating unit by which the operator designates a reference component from the components of said analytical target model while referring to a display provided by said display unit, wherein said mesh dividing unit handles said reference component designated by said reference component designating unit, and a component smaller than said reference component, as exception to target for said mesh dividing process.

11. The mesh dividing device according to claim 10, wherein said mesh dividing unit handles a component of which at least one of the maximum outer dimensions in the three axial directions is less than or equal to the corresponding one of the maximum outer dimensions in the three axial directions of said reference component, as exception to target for said mesh dividing process.

12. The mesh dividing device according to claim 2, further comprising a reference component designating unit by which the operator designates a reference component from the components of said analytical target model while referring to a display provided by said display unit, wherein said mesh dividing unit handles said reference component designated by said reference component designating unit, and a component smaller than said reference component, as exception to target for said mesh dividing process.

13. The mesh dividing device according to claim 12, wherein said mesh dividing unit handles a component of which at least one of the maximum outer dimensions in the three axial directions is less than or equal to the corresponding one of the maximum outer dimensions in the three axial directions of said reference component, as exception to target for said mesh dividing process.

14. The mesh dividing device according to claim 2, wherein said selecting unit automatically selects said selected parameter kit based on said three-dimensional CAD data.

15. The mesh dividing device according to claim 14, wherein said selecting unit computes, based on said three-dimensional CAD data, shape-feature information and physical-property-feature information about said analytical target model or components of said analytical target model, and selects a parameter kit corresponding to the computed shape-feature information and physical-property-feature information, to be said selected parameter kit.

16. The mesh dividing device according to claim 15, wherein:
said library previously classifies and stores said two or more kinds of parameter kits each being brought into correspondence with levels of shape-feature information and physical-property-feature information which are assumed for said analytical target model; and
said selecting unit selects a parameter kit corresponding to levels to which the computed shape-feature information and physical-property-feature information belong, to be said selected parameter kit.

17. The mesh dividing device according to claim 16, wherein said shape-feature information includes information about the scale of said analytical target model and implementation forms of components in said analytical target model.

18. The mesh dividing device according to claim 17, wherein said implementation form is information about volume distribution in said analytical target model.

19. The mesh dividing device according to claim 15, wherein said shape-feature information includes information about the scale said analytical target model and implementation forms of components in said analytical target model.

20. The mesh dividing device according to claim 19, wherein said implementation form is information about volume distribution is said analytical target model.

21. The mesh dividing device according to claim 15, wherein said physical- property-feature information is information about thermal conductivity distribution in said analytical target model.

22. The mesh dividing device according to claim 2, wherein said conversion time estimating unit measures a time required for a simplified mesh dividing process for said analytical target model, the simplified mesh dividing process being performed on the basis of said selected parameter kit, and estimates said conversion time to be a value obtained by multiplying the measured time by a predetermined coefficient.

23. The mesh dividing device according to claim 1, wherein said parameters for division-control include the number of the mesh-division in the three axial directions, tolerances in the three axial directions, and a volume conversion rate.

24. A method for setting, when performing a mesh dividing process to divide an analytical target model provided as three-dimensional CAD data into said cuboids, a maximum number of cuboids which defines the upper limit of the number of cuboids for numerical-analysis, and parameters for division-control for dividing said analytical target model into said cuboids, comprising the steps of:
previously storing two or more kinds of parameter kits, as a library, each including said maximum number of cuboids and said parameters for division-control;
selecting at least one of said two or more kinds of parameter kits stored in said library, when performing a mesh dividing process for said analytical target model; and
setting a maximum number of cuboids and a parameter for division-control included in the selected parameter kit, on a computing unit for performing said mesh dividing process; and
a conversion time estimating unit for estimating, based on said selected parameter kit, a conversion time required for said mesh dividing unit to perform a mesh dividing process for said analytical target model, wherein said display unit displays said conversion time estimated by said conversion time estimating unit.

* * * * *